US012671996B2

(12) United States Patent
Madi et al.

(10) Patent No.: US 12,671,996 B2
(45) Date of Patent: Jun. 30, 2026

(54) UPGRADING CONTROL PLANE NETWORK FUNCTIONS WITH PROACTIVE ANOMALY DETECTION CAPABILITIES

(71) Applicant: Telefonaktiebolaget LM Ericsson (publ), Stockholm (SE)

(72) Inventors: Taous Madi, Thuwal (SA); Hyame Alameddine, Montreal (CA); Makan Pourzandi, Montreal (CA); Amine Boukhtouta, Laval (CA); Guido Socher, Baie d'Urfe (CA); Mohammad Bilal, Kirkland (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 248 days.

(21) Appl. No.: 18/558,272

(22) PCT Filed: May 4, 2022

(86) PCT No.: PCT/IB2022/054135
§ 371 (c)(1),
(2) Date: Oct. 31, 2023

(87) PCT Pub. No.: WO2022/234490
PCT Pub. Date: Nov. 10, 2022

(65) Prior Publication Data
US 2024/0224040 A1     Jul. 4, 2024

Related U.S. Application Data

(60) Provisional application No. 63/184,445, filed on May 5, 2021.

(51) Int. Cl.
*H04W 12/121*      (2021.01)
*H04W 12/037*      (2021.01)

(52) U.S. Cl.
CPC ....... *H04W 12/121* (2021.01); *H04W 12/037* (2021.01)

(58) Field of Classification Search
None
See application file for complete search history.

(56) References Cited

U.S. PATENT DOCUMENTS 11,431,741 B1 *   8/2022   Lin ..................... H04L 63/0227
11,829,866 B1 *  11/2023   Feinstein ............. G06N 3/0455
(Continued)

OTHER PUBLICATIONS

International Search Report and Written Opinion dated Aug. 2, 2022 issued in PCT Application No. PCT/IB2022/054135 filed May 4, 2022, consisting of 17 pages.
(Continued)

*Primary Examiner* — Trang T Doan
(74) *Attorney, Agent, or Firm* — Weisberg I.P. Law, P.A.

(57) ABSTRACT

A method, system and apparatus are disclosed. According to one or more embodiments, a detection node includes processing circuitry that is configured to determine a forecast sequence using a first prediction model, where the forecast sequence is determined based at least in part on an input sequence, and determine a reconstructed forecast sequence using a second prediction model, where the reconstructed forecast sequence is determined based at least in part on the determined forecast sequence. The processing circuitry is also configured to determine a reconstruction error between the determined reconstructed forecast sequence and the determined forecast sequence and determine a signaling behavior for anomaly detection based at least in part on the determined reconstruction error and a predetermined threshold.

26 Claims, 19 Drawing Sheets

(56) References Cited

U.S. PATENT DOCUMENTS

| | | | | |
|---|---|---|---|---|
| 11,973,778 | B2 * | 4/2024 | Giaconi | G06F 21/566 |
| 12,153,401 | B2 * | 11/2024 | Sundstrom | B33Y 50/02 |
| 12,153,668 | B2 * | 11/2024 | Putman | H04L 63/1425 |
| 12,165,353 | B2 * | 12/2024 | Putman | G06N 3/044 |
| 2019/0286506 | A1 * | 9/2019 | Cheng | G06N 3/084 |
| 2020/0076841 | A1 * | 3/2020 | Hajimirsadeghi | H04L 63/1408 |
| 2020/0259851 | A1 * | 8/2020 | Manoselvam | G06N 3/09 |
| 2022/0207326 | A1 * | 6/2022 | Zaker Habibabadi | |
| | | | | G06N 3/044 |
| 2024/0411864 | A2 * | 12/2024 | Stein | G06N 3/04 |

OTHER PUBLICATIONS

Feng et al., Anomaly Detection of Spectrum in Wireless Communication Via Deep Auto-Encoders; The Journal of Supercomputing, Springer US, NY; Mar. 28, 2017, consisting of 17 pages.
Salahuddin et al., Time-Based Anomaly Detection Using Autoencoder; 16 International Conference on Network and Service Management; Nov. 2, 2020, consisting of 9 pages.
Tzagkarakis et al., Botnet Attack Detection at the IoT Edge Based on Sparse Representation; 2019 Global IOT Summit (GIOTS), IEEE; Jun. 17, 2019, consisting of 6 pages.
Park, Outlier and Anomaly Pattern Detection on Data Streams; The Journal of Supercomputing; Springer Science+Business Media, LLC; Nov. 2, 2018, consisting of 11 pages.
SA WG2 Temporary Document; SA WG2 Meeting #135 S2-1910814 (downloading as S2-1910579) (e-mail revision 3 of S2-1910579); Source: Nokia, Nokia Shanghai Bell, Sandvine, Ericsson, InterDigital; Title: New Key Issue for New Types of Feedback Provided by NWDAF and Related Use Cases; Document for: Approval; Agenda Item: 8.2; Work Item / Release: FS_eNA_Ph2, Oct. 14-18, 2019, Split, Croatia, consisting of 5 pages.
3GPP TSG-SA WG3 Meeting #95-Bis S3-192019 (revision of S3-19xabc); Source: Ericsson; Title: DDoS Protection Based on NWDAF and Overload Control; Document for: Approval; Agenda Item: 8.6; Sapporo, Japan, Jun. 24-28, 2019, consisting of 3 pages.
Madi et al., AutoGuard: A Dual Intelligence Proactive Anomaly Detection at Application-Layer in 5G Networks; Cornell University Library; Sep. 30, 2021, consisting of 21 pages.

Malhotra et al., Long Short Term Memory Networks for Anomaly Detection in Time Series; Conference Paper, Apr. 2015, consisting of 7 pages.
Malhotra et al., LSTM-based Encoder-Decoder for Multi-sensor Anomaly Detection; TCS Research, New Delhi, India, Jul. 11, 2016, consisting of 5 pages.
Lin et al., Anomaly Detection for Time Series Using VAE-LSTM Hybrid Model; IEEE International Conference on Acoustics, Speech and Signal Processing (ICASSP); Barcelona, Spain, 2020, consisting of 5 pages.
Chen et al., Outlier Detection with Autoencoder Ensembles; Proceedings of the 2017 Siam International Conference on Data Mining, consisting of 9 pages.
Srivastava, Dropout: A Simple Way to Prevent Neural Networks from Overfitting; Journal of Machine Learning Research 15; (2014), consisting of 30 pages.
Chandola et al., Anomaly Detection: A Survey; ACM Computing Surveys, vol. 41, No. 3, Article 15; Jul. 2009, consisting of 58 pages.
Chalapathy et al., Anomaly Detection Using One-Class Neural Networks; University of Sydney, Capital Markets Co-Operative Research Centre (CMCRC); Jan. 2019, consisting of 13 pages.
An et al., Variational Autoencoder Based Anomaly Detection Using Reconstruction Probability; SNU Data Mining Center; Dec. 27, 2015, consisting of 18 pages.
Pidhorskyi et al., Generative Probabilistic Novelty Detection with Adversarial Autoencoders; In Advances in Neural Information Processing Systems; 2018, consisting of 12 pages.
Andrews et al., Detecting Anomalous Data Using Auto-Encoders; International Journal of Machine Learning and Computing, vol. 6, No. 1; Feb. 2016, consisting of 6 pages.
Hochreiter, The Vanishing Gradient Problem During Learning Recurrent Neural Nets and Problem Solutions; International Journal of Uncertainty, Fuzziness and Knowledge-Based Systems; World Scientific Publishing Company; 2016, consisting of 10 pages.
Rodriguez et al., A Recurrent Neural Network that Learns to Count; Connection Science, vol. 11, No. 1; 1999; consisting of 36 pages.
Hochreiter et al., LSTM Can Solve Hard Long Time Lag Problems; In Neural Information; 1997, consisting of 8 pages.

* cited by examiner

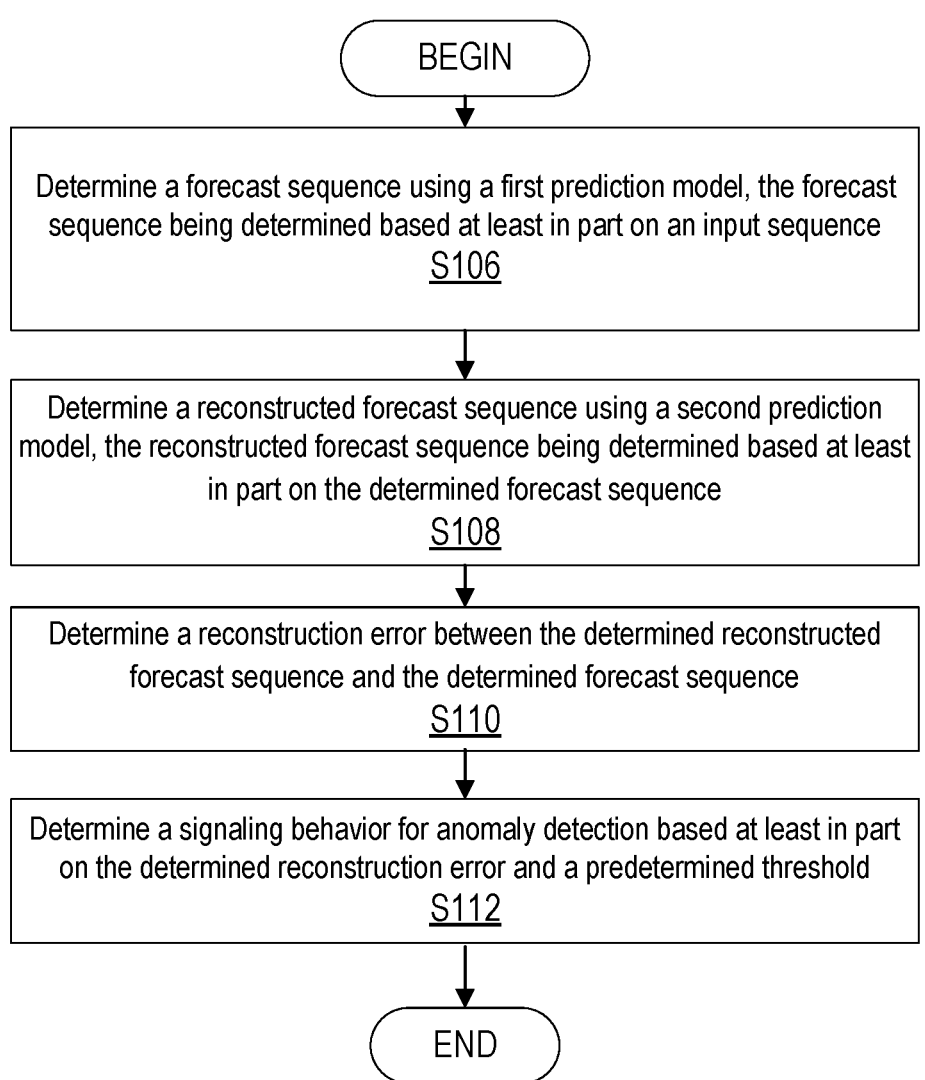

BEGIN

Determine a forecast sequence using a first prediction model, the forecast sequence being determined based at least in part on an input sequence
S106

Determine a reconstructed forecast sequence using a second prediction model, the reconstructed forecast sequence being determined based at least in part on the determined forecast sequence
S108

Determine a reconstruction error between the determined reconstructed forecast sequence and the determined forecast sequence
S110

Determine a signaling behavior for anomaly detection based at least in part on the determined reconstruction error and a predetermined threshold
S112

END

FIG. 5

UPGRADING CONTROL PLANE NETWORK FUNCTIONS WITH PROACTIVE ANOMALY DETECTION CAPABILITIES

CROSS-REFERENCE TO RELATED APPLICATIONS

This application is a Submission Under 35 U.S.C. § 371 for U.S. National Stage Patent Application of International Application No.: PCT/IB2022/054135, filed May 4, 2022 entitled "UPGRADING CONTROL PLANE NETWORK FUNCTIONS WITH PROACTIVE ANOMALY DETECTION CAPABILITIES," which claims priority to U.S. Provisional Application No. 63/184,445, filed May 5, 2021, entitled "UPGRADING CONTROL PLANE NETWORK FUNCTIONS WITH PROACTIVE ANOMALY DETECTION CAPABILITIES," the entireties of both of which are incorporated herein by reference.

TECHNICAL FIELD

The present disclosure relates to wireless communications, and in particular, to anomaly detection in core network signaling based at least on forecasted signaling behaviors.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

Non-Standalone 5th Generation (5G)

5G significantly enhances data speed and end-user experience to fulfill the requirements of a large diversity of innovative use cases and services. However, the journey to a full 5G deployment starts by leveraging the already existing 4G deployments. More specifically, the transition to the 5G core goes through a Non standalone (NSA) 5G Evolved Packet Core (EPC) deployment, which is based on two 5G concepts, namely, the virtualization and the Control-User Plane Separation (CUPS). However, with the increasing adoption of virtualization technologies to pave the way towards 5G, the threat landscape has significantly changed resulting in a considerably extended attack surface of the telecommunication networks. This exposes both the mobile operators' infrastructure and the mobile subscribers to different kinds of control plane attacks taking advantage from the signaling protocols' vulnerabilities (e.g., Diameter, GTP-C).

According to one study on 5G security, signaling or control plane security is currently one of the top areas of focus and more than half of service providers (55% to 65%) plan to launch security use cases on core network signaling in NSA deployments.

Diameter Protocol

The Diameter base protocol (i.e., Diameter protocol, Diameter) is an Authentication, Authorization and Accounting (AAA) protocol for applications such as network access or IP mobility in both local and roaming situations. The Diameter protocol acts at the application layer of the Open Systems Interconnection (OSI) model and runs on top of the TCP or SCTP protocols. Further, the Diameter protocol adopts a peer-to-peer architecture in which diameter nodes, a client and a server, communicate in order to grant or deny access to a user/wireless device.

In addition, the Diameter base protocol is implemented in all diameter nodes and provides basic functionalities such as error notification, user sessions handling and accounting. It can be extended to support other applications through Attribute value pairs (AVPs) that can be added to the Diameter message. AVPs bear different kinds of information such as user authentication information, transportation of service specific authorization information, resource usage information, etc.

Diameter protocol may be used for signaling over the 4G and 5G EPC 3GPP standardized interfaces between the network functions of the same operator network and for relaying signaling messages between the network functions of roaming partners through the Internetwork Packet Exchange (IPX) interconnection model using the Diameter agents. A potential end-to-end architecture for the Diameter protocol in case of roaming is shown in FIG. 1. The presented architecture suggests the presence of Diameter Edge Agent (DEA).

Vulnerabilities

The NSA core network is composed of network functions running on top of a virtualized environment and using Diameter protocol for signaling. Therefore, the new threat landscape is mainly drawn by the vulnerabilities related to the virtualization technology and to Diameter protocol.

It has been illustrated over the past that attackers may take advantage from the virtualization software vulnerabilities and the misconfiguration issues to breach the logical isolation provided by the virtualization layer. For example, if the attacker manages to breach the isolation offered by the virtualization layer, then he can take control of the legitimate Virtual Network Functions and perform malicious activities.

The main Diameter vulnerabilities are related to lack end-to-end encryption and hop-by-hop inspection capabilities as the relay nodes do not have the capability to inspect the content of Diameter messages. In addition, Diameter uses a hop-by-hop routing mechanism, where the answer to a message will always follow the same path as the request. Consequently, if a rogue node sends a Diameter request to a Diameter peer, the Diameter response will be routed to the rogue node instead of the spoofed one, which makes it unlikely for the spoofed node to detect the impersonation.

The vulnerabilities described above can be exploited to perform different types of attacks causing disturbances at core-level network functions leading them to deviate from their normal behavior.

S6a Interface

The aforementioned vulnerabilities can be exploited at the S6a interface connecting the Mobile Management Entity (MME) to the Home Subscriber Server (HSS). As illustrated in FIG. 1, the Diameter roaming architecture connects the home and the visited network mobile operators A and B over the IPX through their respective Diameter edge agents using the S6a 3GPP interface. This interface is of particular importance as it enables the transfer of subscriber related data between the MME and the HSS within the same Mobile Network Operator (MNO) or between the MME of the visited network and the HSS of the home network (FIG. 1). It supports many diameter procedures related to mobility services such as Location management (e.g., update location, purge wireless device, . . . ) and authentication. Each diameter procedure is composed of a set of pairs of request/answer commands/messages.

Examples of those messages are:

Authentication Information Request/Answer (resp. AIR/AIA)

Update Location Request/Answer (resp. ULR/ULA)

Purge UE Request/Answer (resp. PUR/PUA)

Reset Request/Answer (resp. RSR/RSA)

Etc.

Further, S6a can be subject to different types of Diameter signalling attacks. For example, an attack use case related to the fault recovery procedure, namely, Reset Request (RSR) attack can occur. The latter is initiated by a rogue/compromised HSS which uses the Reset Diameter procedure with the aim of causing a sustainability DoS on the legitimate home network HSS.

To address Diameter vulnerabilities, standardization bodies such as the Internet Engineering Task Force (IETF), the 3rd Generation Partnership Project (3GPP) and GSMA proposed different security solutions such as topology Hiding and Diameter filtering. Topology hiding is a security measure that consists of deploying intermediate components (e.g., proxies, gateways) in front of network elements that need to be protected. Topology hiding can be achieved by deploying DEA at the network boundaries in order to prevent attackers from identifying the network topology, and hence, reduces the risks of attacks from foreign networks while also simplifying signaling interaction between different mobile operators. Diameter filtering, also known as Diameter screening, aims at reducing the exposed attack surface of the mobile network operator's Diameter network, the Diameter Routing Agent (DRA) hosting provider, the IPX provider, and other Diameter hosting entities. Diameter filtering can be applied at the diameter proxy/edge agent but not at the diameter relay agent. It can also be outsourced to the IPX.

A Diameter security framework has been proposed that investigates Diameter messages and proposes a real-time blacklist system to protect mobile network operators and their subscribers. A message encryption scheme is also proposed to mitigate against malformed packets.

While existing solutions help reduce the attack surface, these existing solutions do not eliminate the risk related to all possible attacks especially if the virtualized NFV environment is considered, which may be susceptible to new zero-day threats. Furthermore, there are no existing solutions leveraging Artificial Intelligence (AI) approaches to enhance Diameter security through proactive detection capabilities.

The 5G telecommunication Network Function Virtualization (NFV) networks are very complex due to one of more of the virtualization, the multi-tenancy, the large scale and massive connectivity. This complexity significantly enlarges the attack surface (e.g., ways to attack) and generates an extended threat landscape involving both insider and outsider actors and affecting the core network signaling capabilities. More specifically, the signaling between the Mobile Management Entity (MME) and the HSS through the S6a interface, especially in the roaming scenarios, might be subject to attacks affecting the proper operation of different services. However, the lack of visibility and the multitude of involved stakeholders (roaming partners, cloud infrastructure providers, IPX domains, etc.) make the existing security controls ineffective such that new in-depth security solutions may be needed.

Indeed, considering the vast streams of data, which need to be processed and analyzed instantly to support run-time and proactive detection capabilities, a data-driven analytic approach using AI is seen as an enabler for defining predictive, detective and preventive security controls. In an European Telecommunications Standards Institute (ETSI) NFV document, the usefulness of advanced machine learning algorithms and various big data analytics methods to detect patterns and threat vectors as part of the security monitoring life cycle in NFV workloads was described.

Therefore, although the existing security solutions, such as Diameter screening, reduce the attack surface, the risk related to zero-day threats remain high due to the new virtualization context in comparison to the traditional closed operator networks. Additionally, attacks might be stealthy in nature, which makes them very difficult to catch with existing Diameter filtering approaches. As such, existing solutions still suffer from one or more disadvantages described herein.

SUMMARY

Some embodiments advantageously provide methods, systems, and apparatuses for anomaly detection in core network signaling based at least on forecasted signaling behaviors.

For an example of proof of concept, an attack study use case related to the fault recovery procedure, namely, Reset Request (RSR) attack is used. The latter is initiated by a rogue/compromised HSS which uses the Reset Diameter procedure with the aim of causing a sustainability Denial of Service (DOS) on the legitimate home network HSS.

One or more embodiments described herein provide for a proactive anomaly detection solution to predict disturbances at the core network signaling. To this end, on one side, a time series forecasting problem is formulated to train a prediction model for forecasting the future signaling behavior by leveraging application-level performance measurement counters. On the other side, another model is trained to profile the normal signaling behavior for a given future time window. Finally, the two models are combined or used in conjunctions with each other in order to predict whether the forecast signaling behaviors are potentially anomalous.

One or more embodiments described herein can be applied for 3GPP interfaces (e.g., S6a, S10, S11, S9, . . . ) connecting various control plane network functions. As a proof of concept, the S6a Diameter signaling between the HSS and the MME peers located either in the home network or in the visited networks in roaming scenarios are used.

One or more embodiments described herein leverages Deep Learning (DL) techniques to build two models, a forecasting model to forecast the future signaling behavior, and a normal forecast behavior profiling model to detect potential anomalies based at least on the forecast behavior. Once the future signaling behavior is forecasted, the latter is fed into the normal forecast behavior profiling model, which can detect potential upcoming anomalies and raise an alarm. One or more embodiments described herein may be integrated into the control plane network functions (i.e., HSS and MME) as a new security capability to proactively detect Diameter signaling attacks in their early stages, which would allow taking early mitigation actions to avoid or limit the damage that might be caused by the potential anomalies.

Therefore, one or more embodiments of the present disclosure are directed to and provide a proactive anomaly detection approach based on application-level Diameter performance measurement counters by combining forecasting control plane Diameter signaling at the core network and predicting the potential upcoming anomalies. The proactive anomaly detection solution for S6a signaling can be integrated as a new detection capability within the HSS network function.

The proactive detection system includes two combined intelligence layers, namely, the forecasting system and the profiling system. The forecasting system forecasts the future behavior of a system, which is output for feeding into the profiling system to predict whether the forecast future behavior is anomalous. These two combined intelligence layers and configuration allowed for predicting of abnormal behavior in a manner that is not provided in existing systems.

Intuitive explanation: an approach to detect abnormal behavior for a system is to train a forecasting Machine Learning (ML) model based on the logs of its normal behavior and detect the abnormal behavior by comparing the actual system logs once available with the model forecast. This approach augmented by adding a new intelligence layer which enables the system to predict anomalies directly from the forecast behavior, which makes the augmented approach, described herein, proactive as it prevents the system from having to wait until the actual system logs are available to detect an anomaly.

One or more embodiments described herein provide, a system which proactively detects anomalies in Telecom systems based on application-level Diameter performance measurement counters through the:

1. Extraction of Diameter performance measurement counters from Diameter messages and their AVPs.
2. Extraction of statistical features from PM counters and the generation of multivariate time series.
3. Transformation of the multivariate time series into a training dataset with input and output sequences.
4. Use of the training dataset to train the forecasting and the normal forecast behavior profiling models.
5. Use of the forecasting model to predict the future signaling sequence over a future time window.
6. Use of the profiling model to predict anomalous forecasted sequences.
7. Use of generic performance measurement counters to predict anomalies in Diameter signaling between the HSS and the MMEs within the same home network or from different visited networks in roaming scenarios.
8. Use of a long short-term memory (LSTM) neural network to model time dependencies of a target Performance Measurement (PM) counter.
9. Use of an autoencoder as an additional intelligence layer which receives the output of the LSTM model (forecast behavior) to profile the baseline for the forecasted sequences.

According to one aspect of the present disclosure, a detection node is described. The detection node comprises processing circuitry configured to: determine a forecast sequence using a first prediction model, the forecast sequence being determined based at least in part on an input sequence; determine a reconstructed forecast sequence using a second prediction model, the reconstructed forecast sequence being determined based at least in part on the determined forecast sequence; determine a reconstruction error between the determined reconstructed forecast sequence and the determined forecast sequence; and determine a signaling behavior for anomaly detection based at least in part on the determined reconstruction error and a predetermined threshold.

In some embodiments, the detection node further comprises a communication interface configured to receive at least one performance measurement counter associated with at least one signal. The determined signaling behavior is associated with the at least one signal. In some other embodiments, the at least one signal is one of transmitted to and received from a network node using a Diameter protocol. In one embodiment, the at least one performance counter is associated with application-level statistics based on the Diameter protocol. The at least one performance counter is used to train at least one of the first and second prediction models.

In another embodiment, the processing circuitry is further configured to determine a count of at least one of a successful request, an unsuccessful request, a successful response, an unsuccessful response associated with the at least one signal. In some embodiments, the processing circuitry is further configured to determine at least one statistical feature based at least on the determined count. In some other embodiments, the processing circuitry is further configured to determine the input sequence based at least in part on the received at least one performance measurement counter. In one embodiment, the determining of the input sequence includes determining a statistical multivariate time series for the at least one performance measurement counter and using supervised learning to determine the input sequence based on the statistical multivariate time series.

In another embodiment, the first prediction model is a long short-term memory. LSTM, and the second prediction model is an autoencoder. In some embodiments, the reconstructed forecast sequence is a reconstructed vector. In some other embodiments, the reconstruction error is a scalar residual magnitude between the forecast sequence and the reconstructed forecast sequence. In one embodiment, the determining of the signaling behavior includes at least one of determining whether the signaling behavior is one of an abnormal signaling behavior and a normal signaling behavior and flagging at least the abnormal signaling behavior. In another embodiment, the processing circuitry is further configured to determine at least one anomaly score to determine whether the signaling behavior is one of the abnormal signaling behavior and the normal signaling behavior based at least in part on the determined reconstruction error and the predetermined threshold. The abnormal signaling behavior is flagged when the at least one anomaly score is greater than the predetermined threshold.

In some embodiments, the predetermined threshold is based on a harmonic mean of precision and recall of the predetermined threshold. In some other embodiments, the forecast sequence profiles at least one signaling behavior for a future time window. In one embodiment, wherein the determining of the forecast sequence includes building, by a forecast engine, the forecast sequence.

In another aspect, a method in a detection node is described. The method comprises determining a forecast sequence using a first prediction model, the forecast sequence being determined based at least in part on an input sequence; determining a reconstructed forecast sequence using a second prediction model, the reconstructed forecast sequence being determined based at least in part on the determined forecast sequence; determining a reconstruction error between the determined reconstructed forecast sequence and the determined forecast sequence; and determining a signaling behavior for anomaly detection based at least in part on the determined reconstruction error and a predetermined threshold.

In some embodiments, the method further includes receiving at least one performance measurement counter associated with at least one signal. The determined signaling behavior is associated with the at least one signal. In some other embodiments, the at least one signal is one of transmitted to and received from a network node using a Diameter protocol. In one embodiment, the at least one performance counter is associated with application-level statistics based on the Diameter protocol. The at least one performance counter is used to train at least one of the first and second prediction models. In another embodiment, the method further includes determining a count of at least one of a successful request, an unsuccessful request, a successful response, an unsuccessful response associated with the at least one signal.

In some embodiments, the method further includes determining at least one statistical feature based at least on the determined count. In some other embodiments, the method further includes determining the input sequence based at least in part on the received at least one performance measurement counter. In one embodiment, the determining of the input sequence includes determining a statistical multivariate time series for the at least one performance measurement counter and using supervised learning to determine the input sequence based on the statistical multivariate time series. In another embodiment, the first prediction model is a long short-term memory, LSTM, and the second prediction model is an autoencoder.

In some embodiments, the reconstructed forecast sequence is a reconstructed vector. In some other embodiments, the reconstruction error is a scalar residual magnitude between the forecast sequence and the reconstructed forecast sequence. In one embodiment, the determining of the signaling behavior includes at least one of determining whether the signaling behavior is one of an abnormal signaling behavior and a normal signaling behavior and flagging at least the abnormal signaling behavior. In another embodiment, the method further includes determining at least one anomaly score to determine whether the signaling behavior is one of the abnormal signaling behavior and the normal signaling behavior based at least in part on the determined reconstruction error and the predetermined threshold. The abnormal signaling behavior is flagged when the at least one anomaly score is greater than the predetermined threshold.

In some embodiments, the predetermined threshold is based on a harmonic mean of precision and recall of the predetermined threshold. In some other embodiments, the forecast sequence profiles at least one signaling behavior for a future time window. In one embodiment, wherein the determining of the forecast sequence includes building, by a forecast engine, the forecast sequence.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flowchart of another example process in a detection node according to some embodiments of the present disclosure;

DETAILED DESCRIPTION

Figure 1:
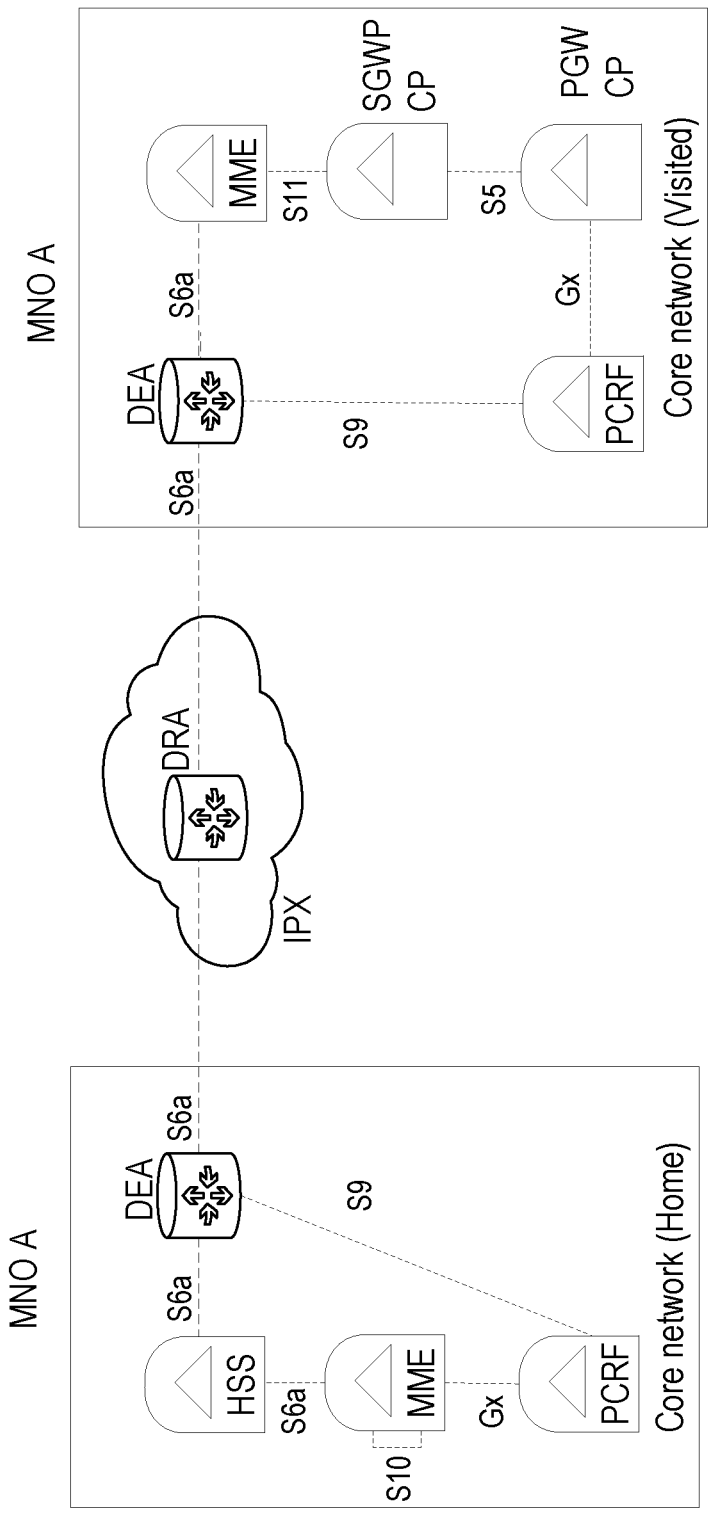
FIG. 1 is a diagram of an end-to-end architecture for diameter roaming.

As described above, there are no existing security solutions that apply a data-driven approach for proactive anomaly detection in NSA 5G core network Diameter signaling. Although the existing security solutions, such as Diameter screening, reduce the attack surface, the risk related to zero-day threats remain high due to the new virtualization context in comparison to the traditional closed operator networks. Additionally, attacks might be stealthy in nature, which makes them very difficult to catch with existing Diameter filtering approaches. The present disclosure helps solve at least some of the problems with existing systems by providing a data-driven approach that transforms signaling-related information into intelligence, which can be leveraged to forecast the signaling behavior for the future time steps, then to proactively capture potential anomalies in their early stages which would enable to take appropriate mitigation actions.

Further, the present disclosure aligns with the trend of security use cases on core network signaling in NSA deployments and augments control plane network functions with new detection capabilities for Diameter signaling protocol in 5G EPC. In a previous proposed solution, detecting Diameter signaling attacks at near-real time (after they happen) was enabled where, after detection, a preliminary root cause analysis was performed to identify the features contributing to the detected anomalies. In the present disclosure, however, one or more embodiments proactively detect Diameter signaling anomalies either in their early stages or before they happen using a combination of forecasting and detection capabilities. This would enable issuing security recommendations to the security management, which will in turn proactively plan the appropriate security responses.

In one or more embodiments, a proactive data-driven anomaly detection approach is provided where the expected future behavior of the core network Diameter signaling is forecasted by leveraging application-level Performance Measurement (PM) counters. Then, the forecasted values are analyzed to predict potential anomalies.

Before describing in detail exemplary embodiments, it is noted that the embodiments reside primarily in combinations of apparatus components and processing steps related to anomaly detection in core network signaling based at least on forecasted signaling behaviors. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises." "comprising." "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IOT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

The term supervised learning (e.g., as used with respect to machine learning and artificial intelligence) may refer to a class of systems and/or algorithms (i.e., processes), which may be configured and/or used to determine a predictive model using data points with known outcomes.

In some embodiments, normal signaling behavior (e.g., normal network behavior) may refer to a behavior that depicts (i.e., reflects, corresponds to, is associated with, etc.) at least a network traffic footprint observed during normal network operation and/or may be used to train a model such as an anomaly detection process/model (e.g., a number/quantity of Update Location Requests (ULRs) observed is within a predetermined range). Abnormal signaling behavior may refer to behavior that depicts (i.e., reflects, corresponds to, is associated with, etc.) any deviation from the normal behavior (e.g., number of ULRs exceeding the predetermined range).

In some embodiments, the general description elements in the form of "one of A and B" corresponds to A or B. In some embodiments, at least one of A and B corresponds to A, B or AB, or to one or more of A and B. In some embodiments, at least one of A, B and C corresponds to one or more of A, B and C, and/or A, B, C or a combination thereof.

Note further, that functions described herein as being performed by a network node or a detection node may be distributed over network nodes and/or detection nodes and/or core network nodes. In other words, it is contemplated that the functions of detection node described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments are directed to anomaly detection in core network signaling based at least on forecasted signaling behaviors.

Figure 2:
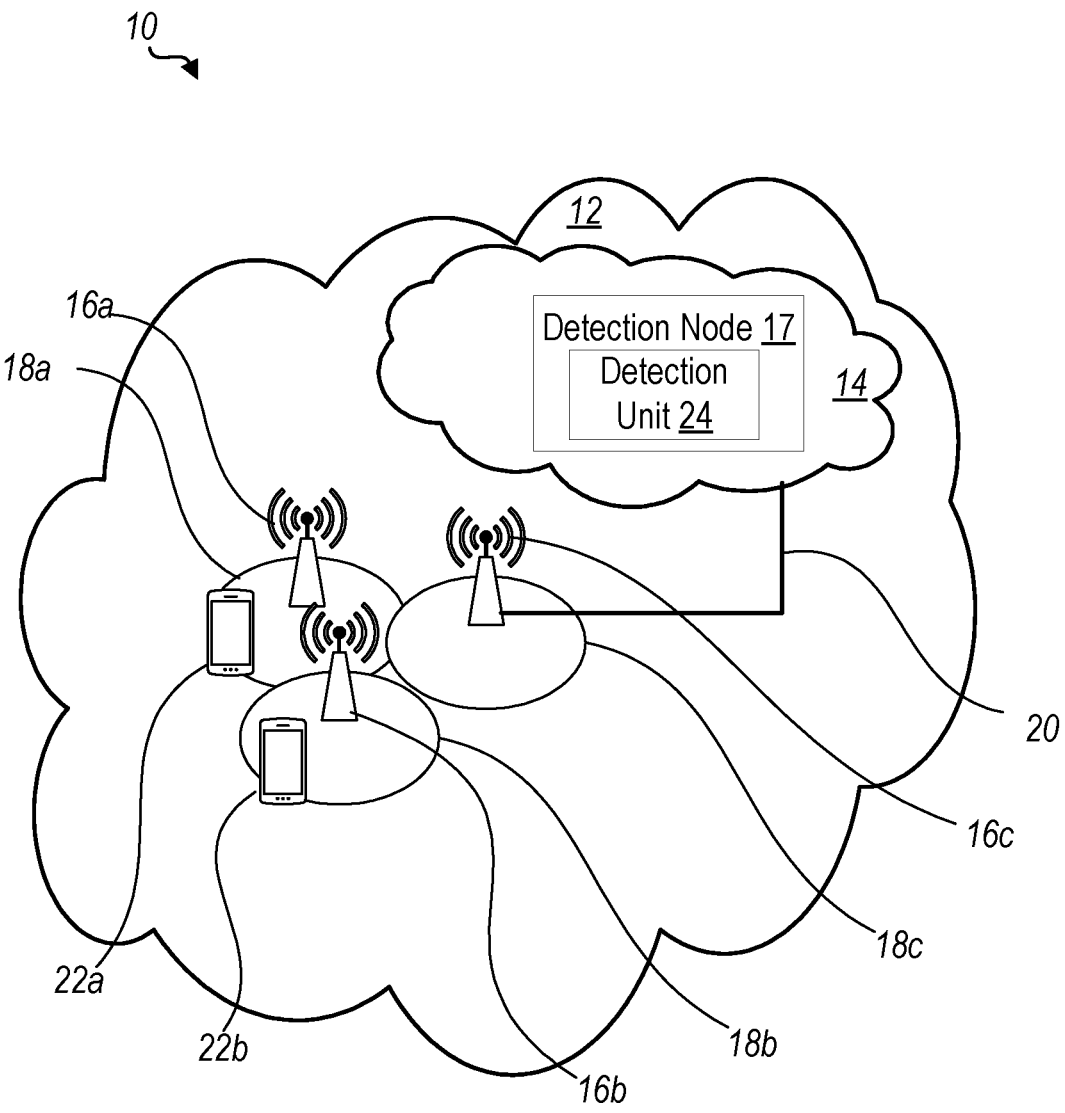
FIG. 2 is a schematic diagram of an example network architecture illustrating a communication system according to principles disclosed herein.

Referring to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. Core network 14 includes one or more detection nodes 17 (collectively referred to as detection node 17) for performing one or more detection node 17 functions described herein. In one or more embodiments, detection node 17 may be part of a core network node. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

Detection node 17 is configured to include detection unit 24 that is configured to perform one or more detection node 17 function such as with respect to anomaly detection in core network signaling based at least on forecasted signaling behaviors, as described herein.

Example implementations, in accordance with an embodiment, of the WD 22, detection node 17 and network node 16 discussed in the preceding paragraphs will now be described with reference to FIG. 3.

The communication system 10 includes a network node 16 provided in a communication system 10 and including hardware 28 enabling it to communicate with the WD 22. The hardware 28 may include a radio interface 30 for setting up and maintaining at least a wireless connection 32 with a WD 22 located in a coverage area 18 served by the network node 16. The radio interface 30 may be formed as or may include, for example, one or more RF transmitters, one or more RF receivers, and/or one or more RF transceivers. The radio interface 30 includes an array of antennas 34 to radiate and receive signal(s) carrying electromagnetic waves.

In the embodiment shown, the hardware 28 of the network node 16 further includes processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 40, which may comprise any kind of volatile and/or nonvolatile memory. e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 42 stored internally in, for example, memory 40, or stored in external memory (e.g., database, storage array, network storage device, etc.) accessible by the network node 16 via an external connection. The software 42 may be executable by the processing circuitry 36. The processing circuitry 36 may be configured to control any of the methods and/or processes described herein and/or to cause such methods, and/or processes to be performed, e.g., by network node 16. Processor 38 corresponds to one or more processors 38 for performing network node 16 functions described herein. The memory 40 is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to network node 16.

The communication system 10 further includes the WD 22 already referred to. The WD 22 may have hardware 44 that may include a radio interface 46 configured to set up and maintain a wireless connection 32 with a network node 16 serving a coverage area 18 in which the WD 22 is currently located. The radio interface 46 may be formed as or may include, for example, one or more RF transmitters, one or more RF receivers, and/or one or more RF transceivers. The radio interface 46 includes an array of antennas 48 to radiate and receive signal(s) carrying electromagnetic waves.

The hardware 44 of the WD 22 further includes processing circuitry 50. The processing circuitry 50 may include a processor 52 and memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 56, which is stored in, for example, memory 54 at the WD 22, or stored in external memory (e.g., database, storage array, network storage device, etc.) accessible by the WD 22. The software 56 may be executable by the processing circuitry 50. The software 56 may include a client application 58. The client application 58 may be operable to provide a service to a human or non-human user via the WD 22.

The processing circuitry 50 may be configured to control any of the methods and/or processes described herein and/or to cause such methods, and/or processes to be performed, e.g., by WD 22. The processor 52 corresponds to one or more processors 52 for performing WD 22 functions described herein. The WD 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein with respect to WD 22.

The communication system 10 includes detection node 17 provided in a communication system 10 such as in core network 14 and including hardware 60 enabling it to communicate with one or more entities in core network 14 and/or network node 16. The hardware 60 may include a communication interface for setting up and maintaining at least a connection 33 with a one or more entities in core network node 16 and/or network node 16. In one embodiments, communication interface 62 includes, for example, one or more RF transmitters, one or more RF receivers, and/or one or more RF transceivers.

In the embodiment shown, the hardware 60 of detection node 17 further includes processing circuitry 64. The processing circuitry 64 may include a processor 66 and a memory 68. In particular, in addition to or instead of a processor, such as a central processing unit, and memory, the processing circuitry 64 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 66 may be configured to access (e.g., write to and/or read from) the memory 68, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, detection node 17 further has software 70 stored internally in, for example, memory 68, or stored in external memory (e.g., database, storage array, network storage device, etc.) accessible by detection node 17 via an external connection. The software 70 may be executable by the processing circuitry 64. The processing circuitry 64 may be configured to control any of the methods and/or processes described herein and/or to cause such methods, and/or processes to be performed, e.g., by detection node 17. Processor 66 corresponds to one or more processors 66 for performing detection node 17 functions described herein. The memory 68 is configured to store data, programmatic software code, model(s), training data and/or other information described herein. In some embodiments, the software 70 may include instructions that, when executed by the processor 66 and/or processing circuitry 64, causes the processor 66 and/or processing circuitry 64 to perform the processes described herein with respect to detection node 17. For example, processing circuitry 64 of detection node 17 may include detection unit 24 which is configured to perform one or more detection node 17 functions such as with respect to anomaly detection in core network signaling based at least on forecasted signaling behaviors, as described herein. In one or more embodiments, detection node 17 (e.g., via processing circuitry 64 (and/or detection unit 24) and/or communication interface 62) may be configured to perform one or more steps and/or processes and/or tasks and/or methods and/or functions described in the present disclosure, e.g., perform forecasting and/or detection functions, determine a forecast sequence, determine a reconstructed sequence, determine a reconstruction error, determining signaling behavior for anomaly detection, etc.

Figure 3:
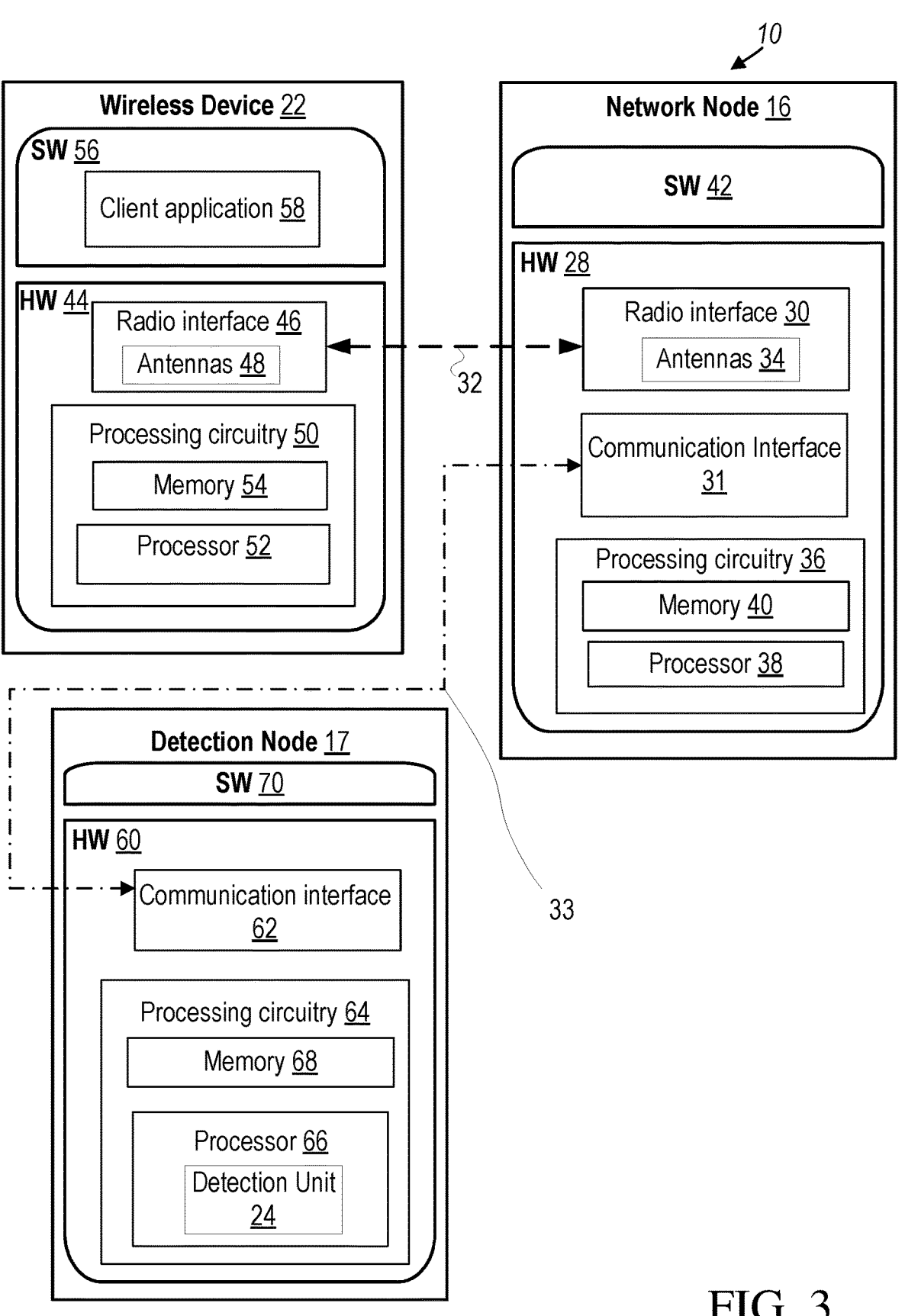
FIG. 3 is a block diagram of a portion of the communication system according to some embodiments of the present disclosure.

In some embodiments, the inner workings of the network node 16, WD 22 and detection node 17 may be as shown in FIG. 3 and independently, the surrounding network topology may be that of FIG. 2.

Although FIGS. 2 and 3 show detection unit 24 as being within a respective processor, it is contemplated that this unit may be implemented such that a portion of the unit is stored in a corresponding memory within the processing circuitry. In other words, the unit may be implemented in hardware or in a combination of hardware and software within the processing circuitry.

Figure 4:
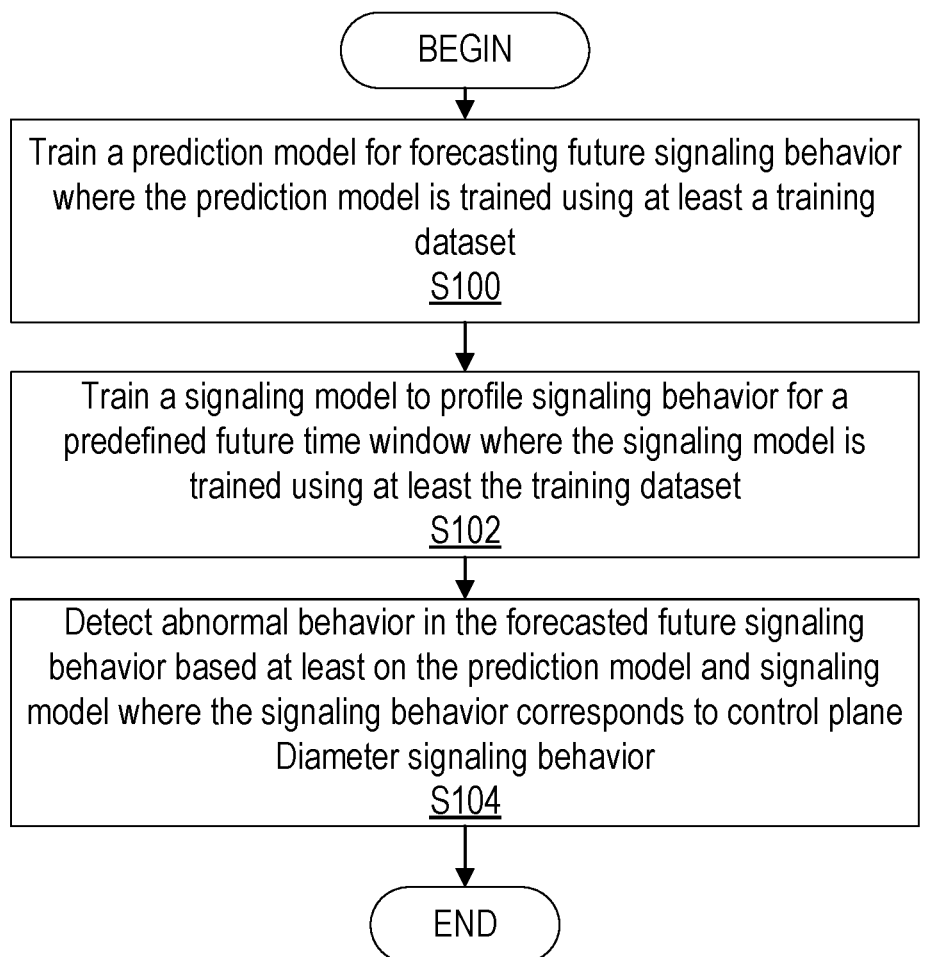
FIG. 4 is a flowchart of an example process in a detection node according to some embodiments of the present disclosure.

FIG. 4 is a flowchart of an example process in a detection node 17 according to one or more embodiments of the present disclosure. One or more blocks described herein may be performed by one or more elements of detection node 17 such as by one or more of processing circuitry 64 (including the detection unit 24), processor 66, and/or communication interface 62. Detection node 17 is configured to train (Block S100) a prediction model for forecasting future signaling behavior, the prediction model being trained using at least a training dataset, as described herein. Detection node 17 is configured to train (Block S102) a signaling model to profile signaling behavior for a predefined future time window where the signaling model is trained using at least the training dataset, as described herein. Detection node 17 is configured to detect (Block S104) abnormal behavior in the forecasted future signaling behavior based at least on the prediction model and signaling model, the signaling behavior corresponding to control plane Diameter signaling behavior, as described herein.

According to one or more embodiments, the forecasted future signaling behavior is input into the signaling model for the detecting of the abnormal behavior, as described herein. According to one or more embodiments, the training dataset is based at least on a multivariate time series that has been transformed to input sequences and output sequences, as described herein.

FIG. 5 is a flowchart of an example process (i.e., an example method) in a detection node 17 according to one or more embodiments of the present disclosure. One or more blocks described herein may be performed by one or more elements of detection node 17 such as by one or more of processing circuitry 64 (including the detection unit 24), processor 66, and/or communication interface 62. Detection node 17 is configured to: determine (Block S106), such as via processing circuitry 64 and/or communication interface 62, a forecast sequence using a first prediction model, where the forecast sequence is determined based at least in part on an input sequence; determine (Block S108), such as via processing circuitry 64 and/or communication interface 62, a reconstructed forecast sequence using a second prediction model, where the reconstructed forecast sequence is determined based at least in part on the determined forecast sequence; determine (Block S110), such as via processing circuitry 64 and/or communication interface 62, a reconstruction error between the determined reconstructed forecast sequence and the determined forecast sequence; and determine (Block S112), such as via processing circuitry 64 and/or communication interface 62, a signaling behavior for anomaly detection based at least in part on the determined reconstruction error and a predetermined threshold.

In some embodiments, the method further includes receiving, such as via processing circuitry 64 and/or communication interface 62, at least one performance measurement counter associated with at least one signal. The determined signaling behavior is associated with the at least one signal. In some other embodiments, the at least one signal is one of transmitted to and received from a network node using a Diameter protocol. In one embodiment, the at least one performance counter is associated with application-level statistics based on the Diameter protocol. The at least one performance counter is used to train at least one of the first and second prediction models.

In another embodiment, the method further includes determining, such as via processing circuitry 64 and/or communication interface 62, a count of at least one of a successful request, an unsuccessful request, a successful response, an unsuccessful response associated with the at least one signal. In some embodiments, the method further includes determining, such as via processing circuitry 64 and/or communication interface 62, at least one statistical feature based at least on the determined count. In some other embodiments, the method further includes determining, such as via processing circuitry 64 and/or communication interface 62, the input sequence based at least in part on the received at least one performance measurement counter. In one embodiment, the determining of the input sequence includes determining a statistical multivariate time series for the at least one performance measurement counter and using supervised learning to determine the input sequence based on the statistical multivariate time series.

In another embodiment, the first prediction model is a long short-term memory (LSTM) and the second prediction model is an autoencoder. In some embodiments, the reconstructed forecast sequence is a reconstructed vector. In some other embodiments, the reconstruction error is a scalar residual magnitude between the forecast sequence and the reconstructed forecast sequence. In one embodiment, the determining of the signaling behavior includes at least one of determining whether the signaling behavior is one of an abnormal signaling behavior and a normal signaling behavior and flagging at least the abnormal signaling behavior.

In another embodiment, the method further includes determining, such as via processing circuitry 64 and/or communication interface 62, at least one anomaly score to determine whether the signaling behavior is one of the abnormal signaling behavior and the normal signaling behavior based at least in part on the determined reconstruction error and the predetermined threshold. The abnormal signaling behavior is flagged when the at least one anomaly score is greater than the predetermined threshold. In some embodiments, the predetermined threshold is based on a harmonic mean of precision and recall of the predetermined threshold. In some other embodiments, the forecast sequence profiles at least one signaling behavior for a future time window. In one embodiment, wherein the determining of the forecast sequence includes building, by a forecast engine, the forecast sequence.

Having described the general process flow of arrangements of the disclosure and having provided examples of hardware and software arrangements for implementing the processes and functions of the disclosure, the sections below provide details and examples of arrangements for anomaly detection in core network signaling based at least on forecasted signaling behaviors.

Some embodiments provide anomaly detection in core network signaling based at least on forecasted signaling behaviors.

One or more functions, modules and components described below with respect to anomaly detection in core network signaling based at least on forecasted signaling behaviors may be performed by one or more of processing circuitry 64, communication interface 62, detection unit 24, etc.

Figure 6:
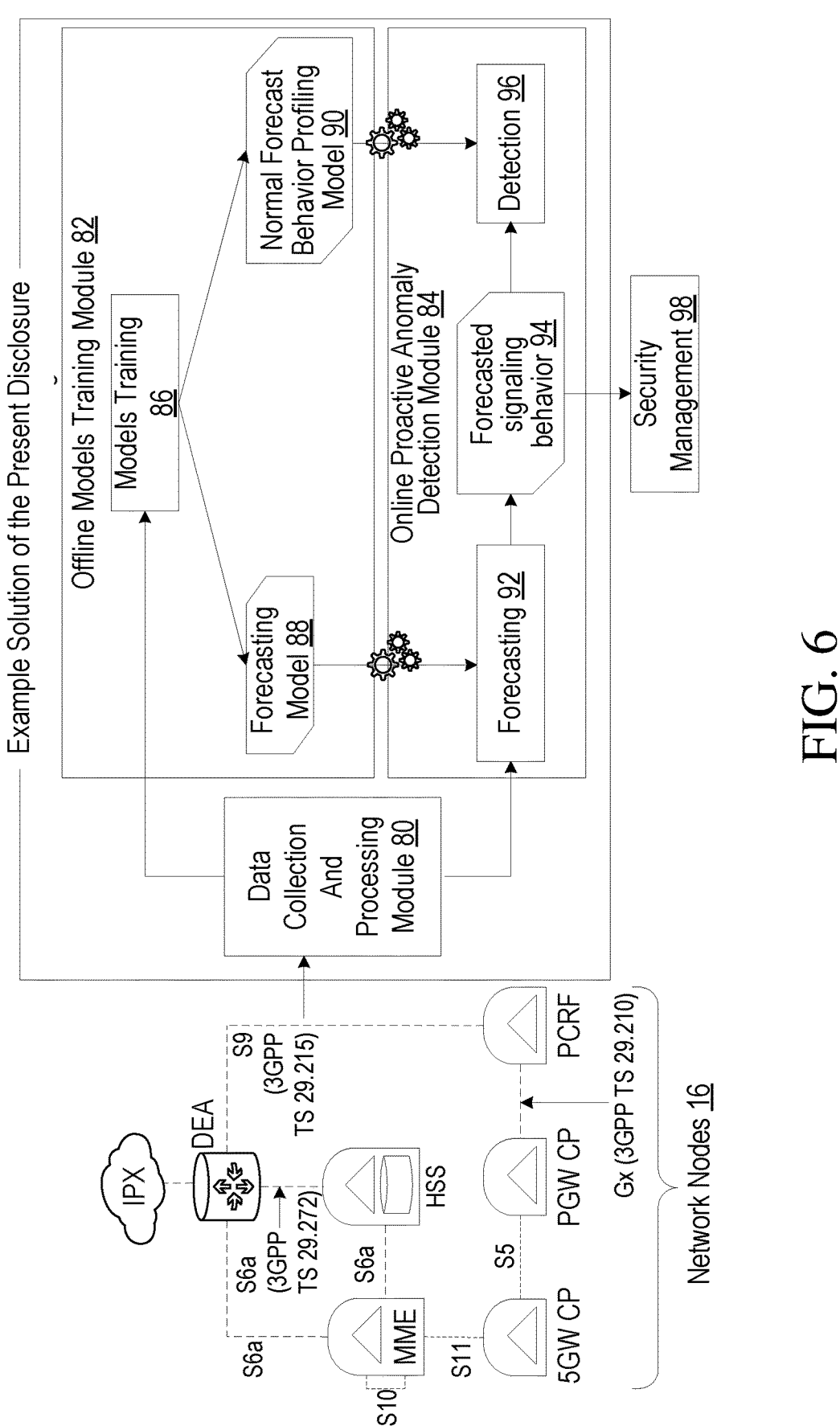
FIG. 6 is a diagram of an example of a general approach according to some embodiments of the present disclosure.

FIG. 6 provides a high-level overview of the proactive anomaly detection approach that is in accordance with the teachings of the present disclosure. The proactive anomaly detection approach includes three modules that may be provided by detection unit 24 of detection node 17: a data collection and processing module 80, an offline model training module 82, and an online proactive anomaly detection module 84. The data collection and processing module is in charge of data collection, performance measurement counter extraction and processing, among other functions described herein. The offline model training module 82 trains a forecasting model 88 (i.e., prediction model) and a normal forecast behavior profiling model 90 (i.e., signaling model), as described herein. The online proactive anomaly detection module 84 predicts the anomalous forecasted behaviors, as described herein. While the forecasting engine (i.e., forecasting model 88 and/or forecasting 92) predicts the signaling behavior for the future time steps (i.e., for a predefined time window), the anomaly detection module (i.e., detection 96) evaluates whether the forecasted signaling behavior 94 is potentially anomalous. Online proactive anomaly detection module 84 may communicate with security management 98 to receive/transmit information (e.g., information associated with forecasted signaling behavior 94). At least one of the data collection and processing module 80, offline models training module 82, online proactive anomaly detection module 84, models training 86, forecasting model 88, normal forecast behavior profiling model 90, forecasting 92, forecasted signaling behavior 94, and detection 96 may be comprised in detection node 17, e.g., comprised in processing circuitry 64 and/or processor 66 and/or detection unit 24, and/or may be configured to perform the corresponding steps/functions described herein.

Note that signaling behavior refers to the signaling characteristics which can be captured through performance measurement counters. For example, to predict the future Diameter workload in total, this signaling characteristic will be captured through the performance measurement counter, which provides the number of received/sent requests/answers. The three modules of are detailed below.

Data Collection and Processing Module

The data collection and processing module 80 includes (and/or be configured to perform) one or more steps, e.g., two different steps: the performance measurement counters extraction and the statistical feature-sets calculation, which are described in detail below.

Performance Measurement Counters Extraction

One or more embodiments described herein are based on Diameter application-level statistics (performance measurement counters), which can be collected either using log files collected at the HSS network function in a batch mode or using monitoring tools placed at the S6a HSS interface.

This step includes extracting the performance measurement counters which are relevant to the analysis. The performance measurement counters indicate and/or report attributes on the number of sent/received Diameter messages and/or the number of successful/unsuccessful answers, for example. Two categories of performance measurement counters include: generic counters ($PM_G$) and interface-specific counters ($PM_{Int}$, $Int \in \{S6a, S6m, S6t, S9, \ldots\}$) maintained by a peer. For example, when the HSS has Diameter sessions are established with multiple MMEs over the S6a interface, a set of S6a-specific counters is maintained for each MME separately at the HSS level. Examples of performance measurement counters and their types are provided in Table 1.

TABLE 1

Examples of PM counters collected from the HSS network function

| Type | Performance Measurement Counters |
|------|----------------------------------|
| Generic Diameter error counters ($PM_G$) | MalformedReceivedRequest<br>ProtocolErrorAndPermanentFailure<br>IncomingMessageDiscardedDueToOverload<br>OutgoingMessageDiscardedDueToCongestion |
| Generic Diameter traffic counters ($PM_G$) | ReceivedAnswerFromPeer<br>ReceivedRequestFromPeer<br>ReceivedUnsuccessfulAnswerFromPeer<br>SentAnswerToPeer<br>SentRequestToPeer<br>SentUnsuccessfulAnswerToPeer |
| HssEsmServiceCountersonS6a ($PM_{S6a}$) | HssS6aAuthInfoAnswersDiaSuccess<br>HssS6aAuthInfoRequests<br>HssS6aPurgeUEAnswersDiaSuccess<br>HssS6aPurgeUERequests<br>HssS6aUpdateLocationAnswersDiaSuccess<br>HssS6aUpdateLocationRequests<br>HssS6aCancelLocationAnswersDiaSuccess<br>HssS6aCancelLocationRequests |

Statistical Feature-Sets Calculation

Figure 7:
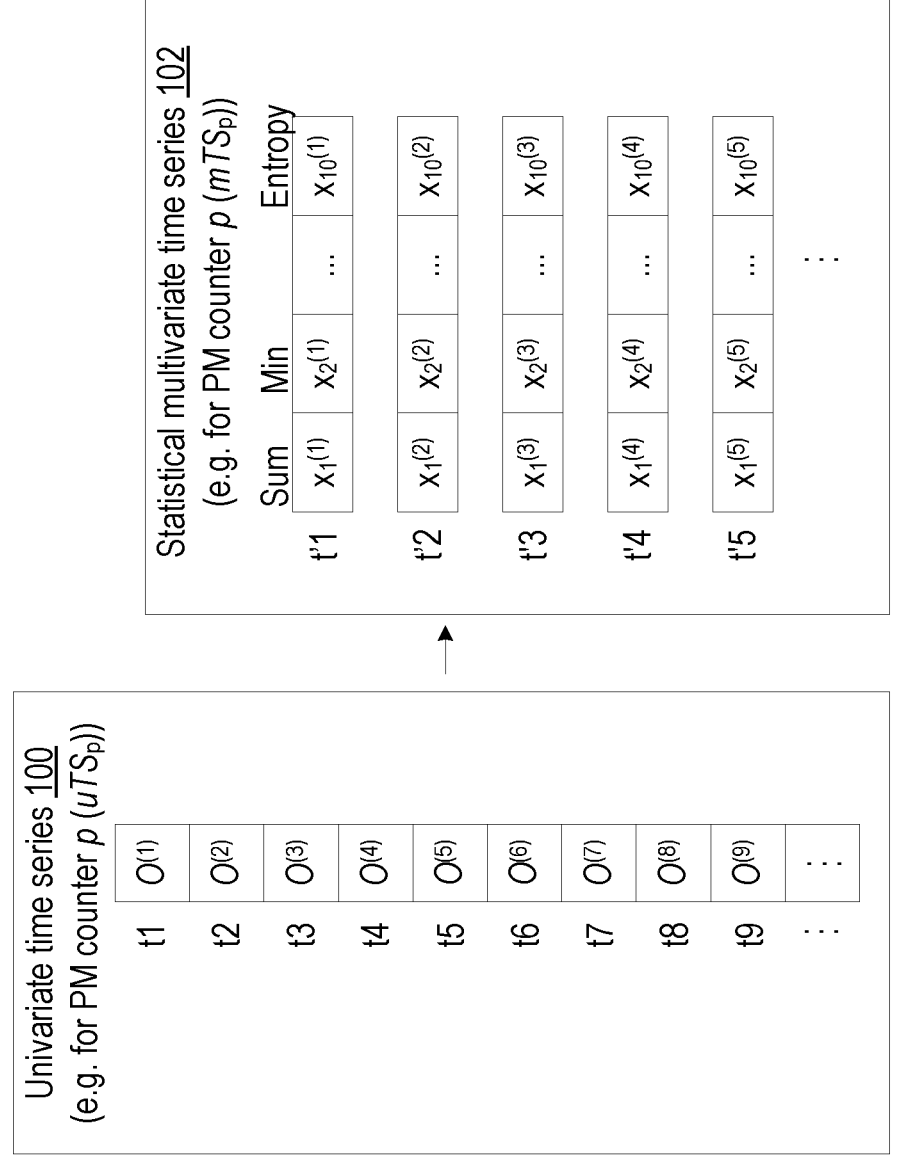
FIG. 7 is a diagram of an example multivariate time series generation according to some embodiments of the present disclosure.

This step includes preparing a statistical multivariate times series 102 using the extracted PM counters, as illustrated in FIG. 7. For the univariate time series 100, observations are aggregated over a time period ti, while for the multivariate time series feature-vectors are aggregated over a time window t'i, where (i∈{1,2,3, . . . }). The generated time series is then used to generate the training datasets both for the forecasting model and for the normal forecasted behavior profiling model.

A univariate time series 100 $uTS_p = \{O^{(1)}, O^{(2)}, \ldots, O^{(n)}\}$ is considered, which reports the observed values of the PM counter of interest p over n time steps. Using $uTS_p$, a multivariate time series 102 $mTS_p = \{x^{(1)}, x^{(2)}, \ldots, x^{(n-s+1)}\}$ composed of a set of 10 statistical features ($F_s$) calculated over a given time window s is generated, where each point $x^{(t)} \in R^{10}$ in the time series is an 10-dimensional vector $$\{x_1^{(t)}, x_2^{(t)}, \ldots, x_{10}^{(t)}\}.$$

Table 2 reports the statistical features composing the multivariate time series 102. More details on the approach followed to generate the multivariate time series 102 are provided in the Appendix section "Generating the statistical multivariate time series."

TABLE 2

Feature-set used for learning time dependencies
of a target PM counter (forecasting)

| Statistical Features ($F_s$) | Description |
|------------------------------|-------------|
| Sum | Sum of the target PM counter values recorded during the time window |
| Min | Minimum value of the target PM counter values recorded during the time window |
| Max | Maximum value of the target PM counter values recorded during the time window |
| Mean | Mean of the target PM counter values recorded during the time window |
| Variance | Variance of the target PM counter values recorded during the time window |
| Standard deviation | Standard deviation of the target PM counter values recorded during the time window |
| Median | Median of the target PM counter values recorded during the time window |
| Percentile 75 | Percentile 75 of the target PM counter values recorded during the time window |
| Percentile 95 | Percentile 95 of the target PM counter values recorded during the time window |
| Entropy | Entropy of the target PM counter values recorded during the time window |

Offline Models' Training

One or more embodiments of anomaly detection module (i.e., online proactive anomaly detection module 84) uses a forecasting model on top of which a new intelligence layer is added to profile the baseline forecast behavior. Hence, two different models are trained, the forecasting model 88 (i.e., prediction model) for predicting the future behavior in next time steps, and the normal forecast behavior profiling model 90 (i.e., signaling model) for proactively detecting potential anomalies in the predicted future behavior. Thus, the output of the forecasting model 88 is ingested to or input into the profiling model, which provides for proactively detecting the forecast behaviors that deviate from the baseline.

In the following, it is described how to generate the training dataset and also the input to each one of those models.

Forecasting with LSTM Networks

To build the forecasting model, LSTM networks which can learn both long-term and short-term dependencies over temporal sequences are used, where are further describe din Appendix section "Forecasting with LSTM neural networks"). The choice of LSTM neural networks is motivated by the fact that they directly support parallel inputs (i.e., multivariate time series) and variable input/output sequences.

Figure 8:
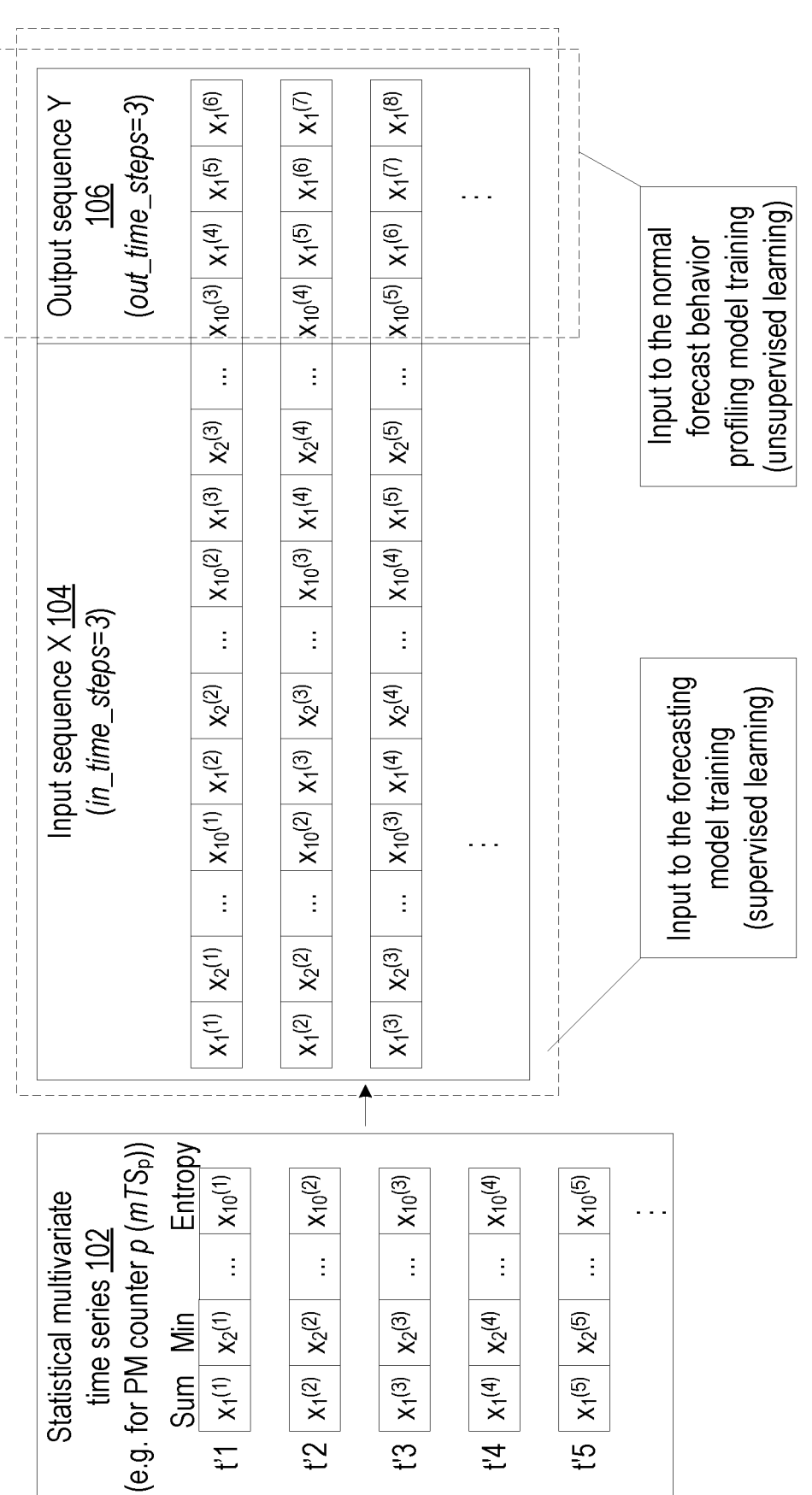
FIG. 8 is a diagram of an example training dataset according to some embodiments of the present disclosure.

However, to use LSTM networks for forecasting, the multivariate time series 102 generated in previous step is transformed into a data-set, i.e., training dataset, composed of an input sequences (X) 104 and output sequences (Y) 106, which can be used for supervised learning. FIG. 8 is a diagram of a training dataset where the dataset is within a dashed rectangle (lag and forecast observations) is used for training the forecasting model, while only the forecast observations are used to train the anomaly detection model. Hence, the forecasting model training algorithm learns to predict the output sequences (future/forecast time steps) from the input sequences (past/lag time steps). Thus, this transformation takes two arguments, namely, the number of lag or input time steps (in_time_steps) and the number of forecast or output time steps (out_time_steps). In the example illustrated in FIG. 8, both the input time steps and the output time steps may be set to three.

Note that in this nonlimiting example, multiple statistical features are used as input, but only one feature is forecast for the next time steps, which is the total number (sum) of the target PM counter values ($x_1$) for the three future time steps. Although only one feature is forecast in this nonlimiting example, forecasting is not limited as such, e.g., more than one feature may be forecast. Using multiple statistical features increases the forecasting model's accuracy as it enables to better capture the time dependencies.

Normal Forecast Behavior Profiling with Autoencoders

To build the normal forecast behavior profiling model, one or more autoencoders are used. The input to this model is of the same form as the output of the LSTM forecasting model, which is a one feature forecast (e.g., total number/ sum of the target PM counter values) for the next time steps (out_time_steps). Therefore, such an input is built out of the output sequences Y from the same training dataset, as illustrated in FIG. 8, to train the model for profiling the normal output sequences. In particular, the model is trained to profile the "baseline" or "benign" behavior, which is not the result of an anomaly. Hence, a normal output sequence references to the baseline expected behavior while the output sequence is the Y sequence in the training set.

For illustration, considering the example in FIG. 8, the LSTM model is trained to forecast sequences $Y \in R^3$. Hence, the same output sequence Y 106 is used for the training data set both to train the LSTM network in a supervised way (to learn future sequences given past sequences) and to train the autoencoder in an unsupervised way (to capture the correlations within the forecast sequences). The Appendix provides more details on autoencoders (Section "Autoencoders") and anomaly detection with autoencoders (Section "Anomaly detection with autoencoders").

Online Proactive Anomaly Detection

Figure 9:
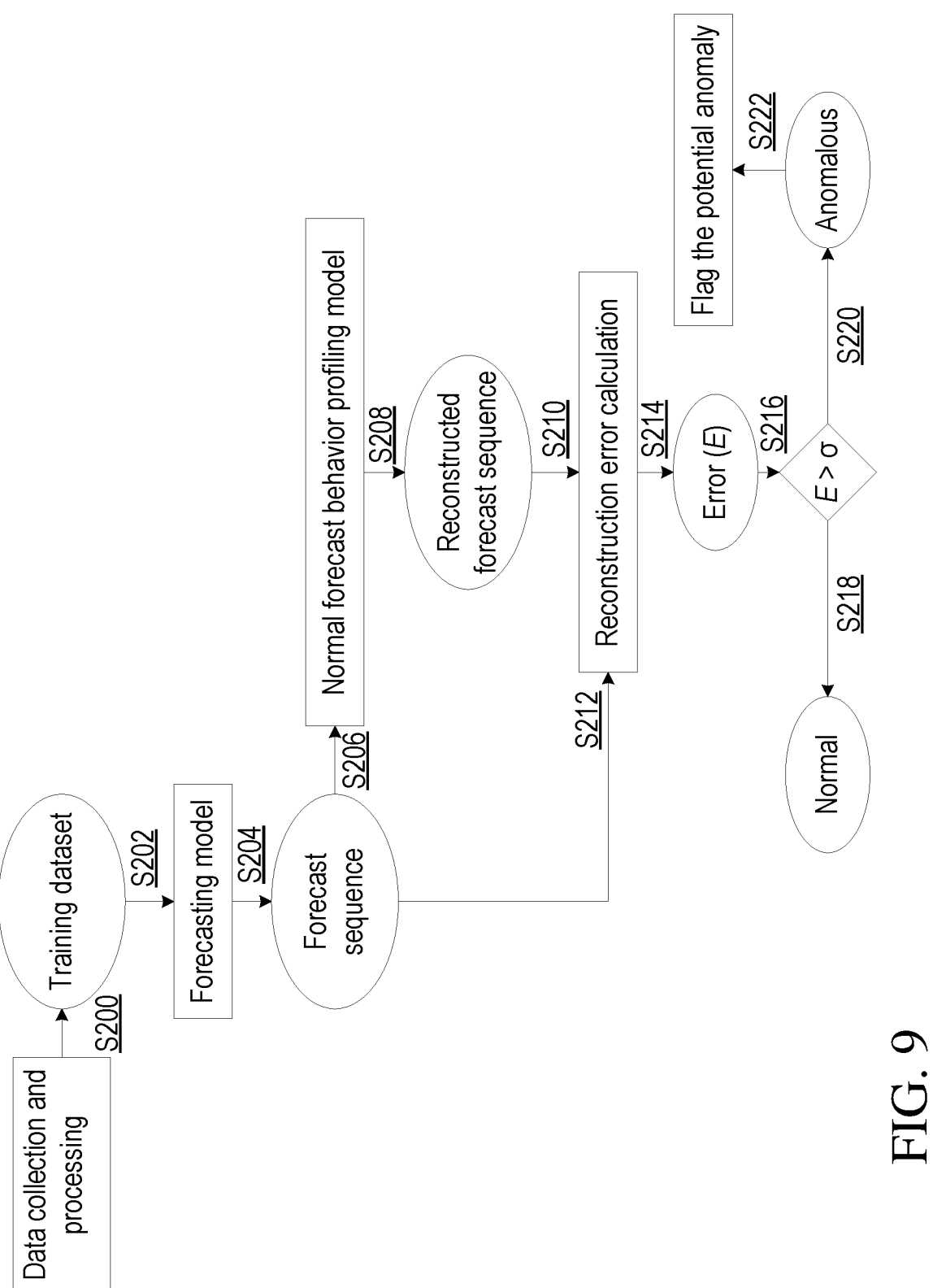
FIG. 9 is a flow diagram of an example online proactive anomaly detection according to some embodiments of the present disclosure.

The online proactive anomaly detection phase has (i.e., online proactive anomaly detection module 84 may be configured to perform) one or more steps, e.g., two steps. In the first step, the forecasting engine receives the input data and feeds it into the forecasting model. The latter generates the predicted output sequence for the future time steps ($y=\{y^{(t+1)}, y^{(t+2)}, \ldots, y^{(t+out\_time\_steps)}\}$). In the next step, the forecasted sequence is fed into the normal forecast behavior profiling model, which outputs the reconstructed vector of forecasted sequence ($\tilde{y}=\{\tilde{y}^{(t+1)}, \tilde{y}^{(t+2)}, \ldots, \tilde{y}^{(t+out\_time\_steps)}\}$). Then, the reconstruction error is calculated based on the forecasted sequence and the reconstructed one. If the reconstruction error exceeds a given threshold, the forecasted sequence is flagged as a potential upcoming anomaly. The flow diagram in FIG. 9 illustrates an example process for online proactive anomaly detection. More specifically, at step S200, a training dataset is determined based on an input from data collection and processing (e.g., data collection and processing module 80). At step S202 the training dataset is fed to the forecasting model. At step S204, a forecast sequence is determined, which is fed to the normal forecast behavior processing model (e.g., normal forecast behavior profiling model 90) at step S206. At step 208, a reconstructed forecast sequence is determined, which is used as an input for the reconstruction error calculation. At step S212, the forecast sequence is also used as an input for the reconstruction error calculation. At step S214 an Error (E) is determined, and at step S216 the Error (E) is compared to a threshold σ. At step S218, signaling behavior is determined to be normal based on the Error (E) and the threshold σ. At step 220, signaling behavior is determined to be an anomaly based on the Error (E) and the threshold σ. At step S222, the anomaly is tagged as an anomaly (e.g., a potential anomaly). Appendix Section "Identifying anomalies" provides more details on anomaly detection with autoencoders and Appendix Section "Choosing the best threshold using performance metrics" provides details for the threshold definition.

Figure 10:
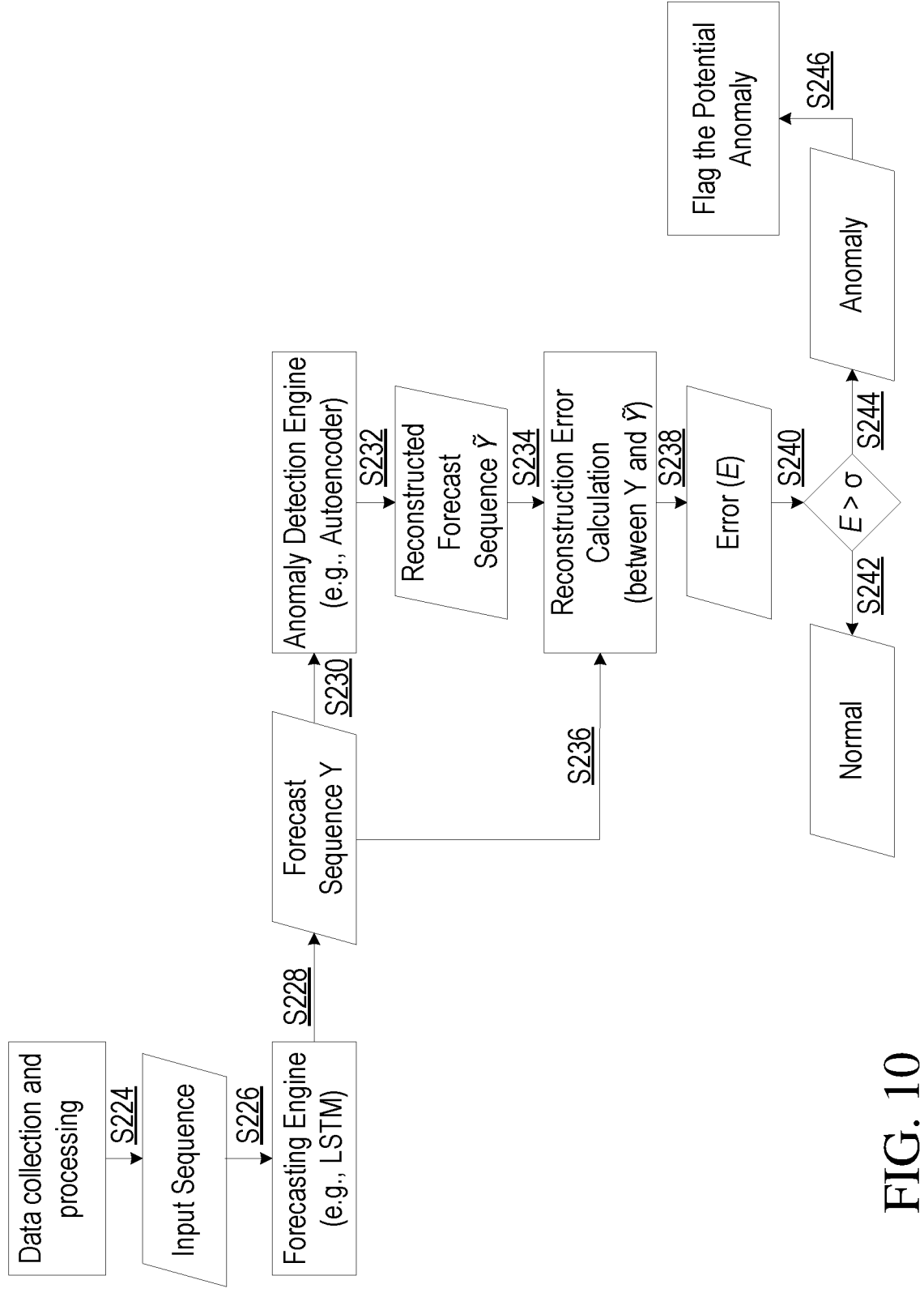
FIG. 10 is a flow diagram of another example online proactive anomaly detection according to some embodiments of the present disclosure.

FIG. 10 shows another example process for online proactive anomaly detection according to the principles of the present invention. At step S224, an input sequence is determined based on an input from data collection and processing (e.g., data collection and processing module 80). At step S226, the input sequence is used an input by the forecasting engine (e.g., LSTM). At step S228 a forecast sequence Y is determined based on an input from the forecast engine. The forecast sequence Y is used an input by the anomaly detection engine (e.g., autoencoder). At step S232, a reconstructed forecast sequence $\tilde{Y}$ is determined, which is used as an input for the reconstruction error calculation. At step S236, the forecast sequence Y is used as an input for the reconstruction error calculation (e.g., between Y and $\tilde{Y}$). At step S238, an Error (E) is determined, which is used at step S240 for a comparison to a threshold σ. At step S242, signaling behavior is determined to be normal based on the Error (E) and the threshold σ. At step 244, signaling behavior is determined to be an anomaly based on the Error (E) and the threshold σ. At step S246, the anomaly is tagged as an anomaly (e.g., a potential anomaly).

Figure 11:
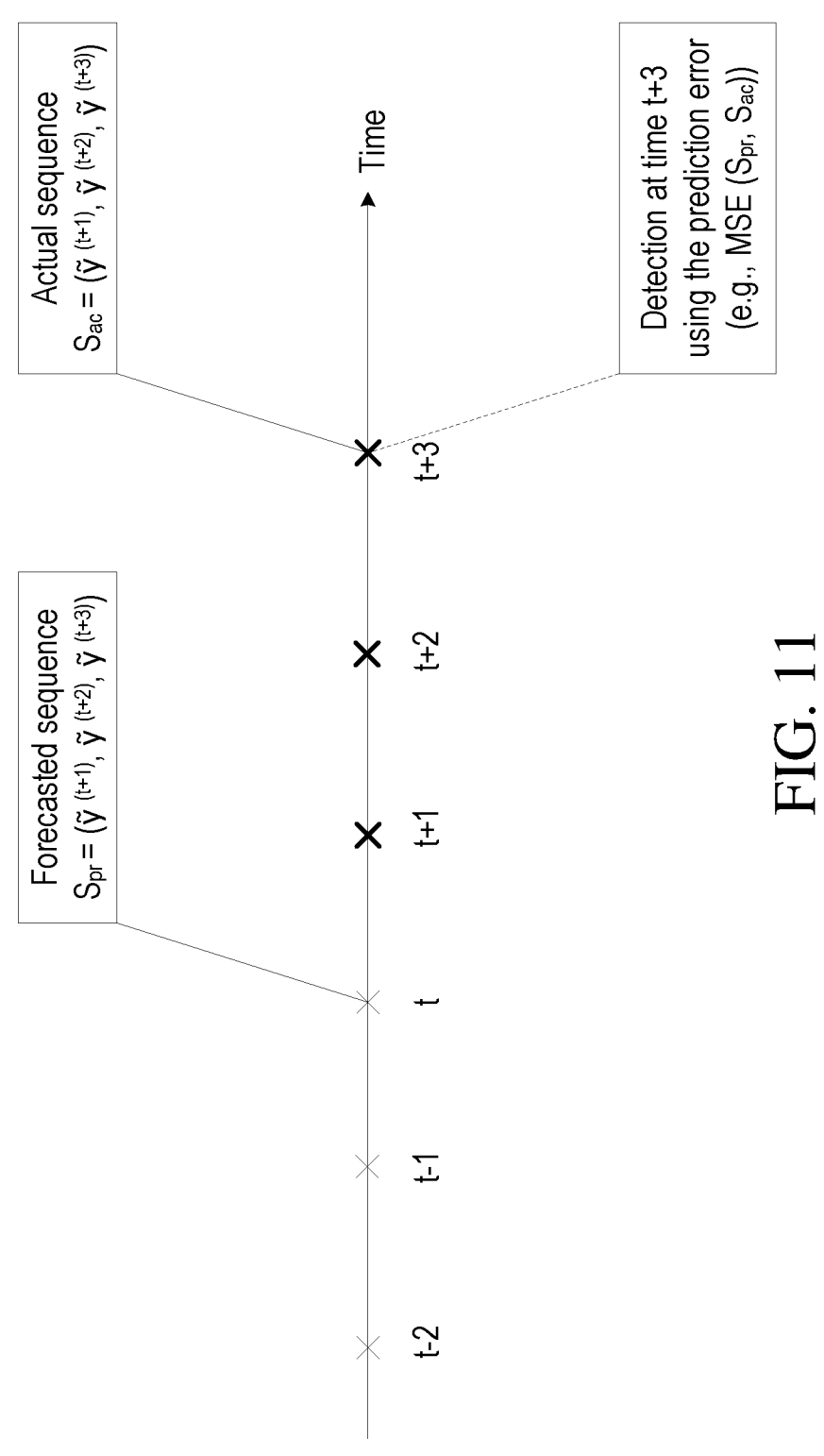
FIG. 11 is an example runtime detection (after the fact) using the prediction error of the forecasting model according to some embodiments of the present disclosure.
Figure 12:
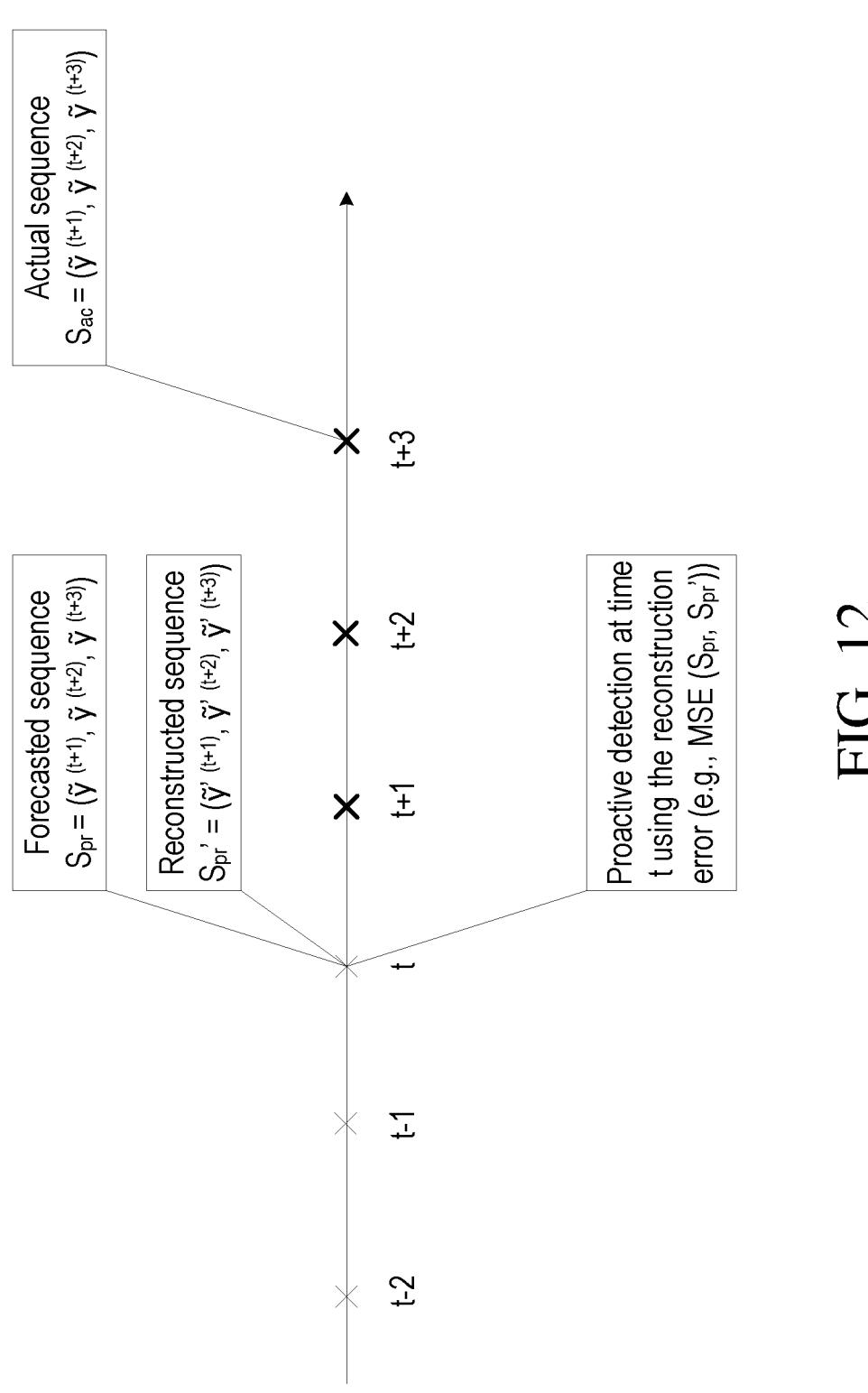
FIG. 12 is an example proactive detection (before the fact) using the reconstruction error of the normal forecast behavior profile model according to some embodiments of the present disclosure.

One or more embodiments advantageously feed the forecasting input into an additional intelligence layer, namely, the autoencoder, for proactively detecting the anomalies based on the forecasted sequences, which is a configuration that is not provided in existing solutions. For example, existing solutions for time series anomaly detection using deep learning techniques apply the approach illustrated in FIG. 11. First, the future sequence ($S_{pr}$) is predicted at time t with the forecasting model, then once the complete actual sequence ($S_{ac}$) is recorded (at t+3 in the example of FIG. 11), the prediction error is calculated using the predicted and the actual sequences and used as a measure to detect anomalies. As, the prediction error can only be calculated after the actual sequence is collected, anomalies are detected only after the fact. However, in one or more embodiments described herein, proactiveness in the detection is provided by training a second model (autoencoder) to recognize the anomalous forecasted sequences before they are manifested using the reconstruction error as illustrated in FIG. 12 (note that the prediction is performed at time t in FIG. 12, while it is performed time t+3 in FIG. 11). This enables to issue security recommendations to allow for appropriate mitigation actions to be proactively taken through the security management components.

Experimental Results

Some experimental results related to the forecasting model and the anomaly detection model training, validation and test are presented in this section. For the experiments, the objective is to forecast and predict anomalies with respect to the total number of received Diameter requests performance measurement counter.

For the forecasting model, an LSTM encoder-decoder is used with the following parameters:

Two hidden LSTM layers with 200 neurons each.

The cardinality of the input layer is equal 30, which is in_time_steps×$|F_s|$, where in_time_steps=3 and $|F_s|$=10.

The cardinality of the output layer is equal to the output sequence length out_time_steps=3.

Figure 13:
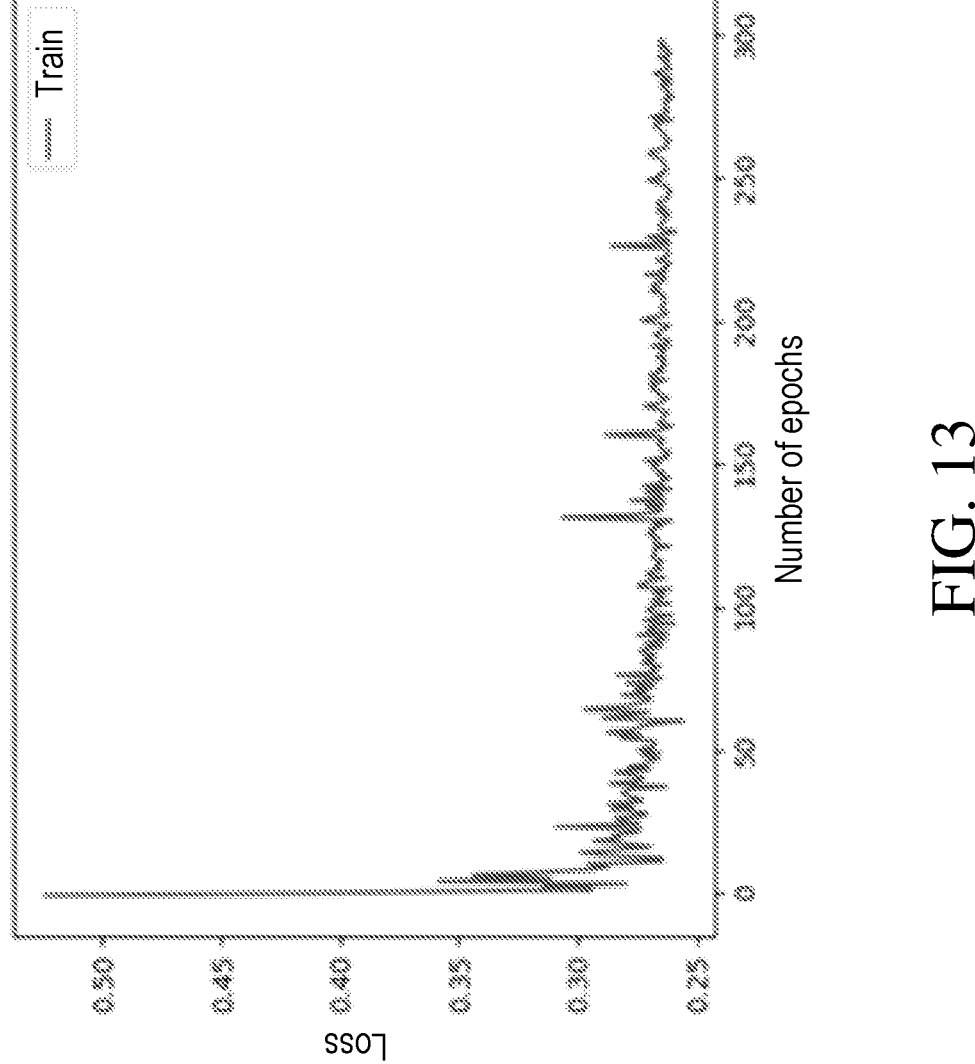
FIG. 13 is a diagram of example training loss in terms of Mean Square Error (MSE) according to some embodiments of the present disclosure.

FIG. 13 is a diagram that shows an example training loss in terms of Mean Squared Error (MSE) for the forecasting model. The loss function measures how good, quality wise, the model is, where smaller values indicate better quality (e.g., more accurate, better prediction, etc.). After 250 epochs, the loss stabilizes approximately at 0.27.

For the anomaly detection model, a vanilla autoencoder with one hidden layer composed of 4 nodes was used, while the cardinality of the input and the output layers is equal to the size of the output sequence length, which is equal to 3.

Figure 14:
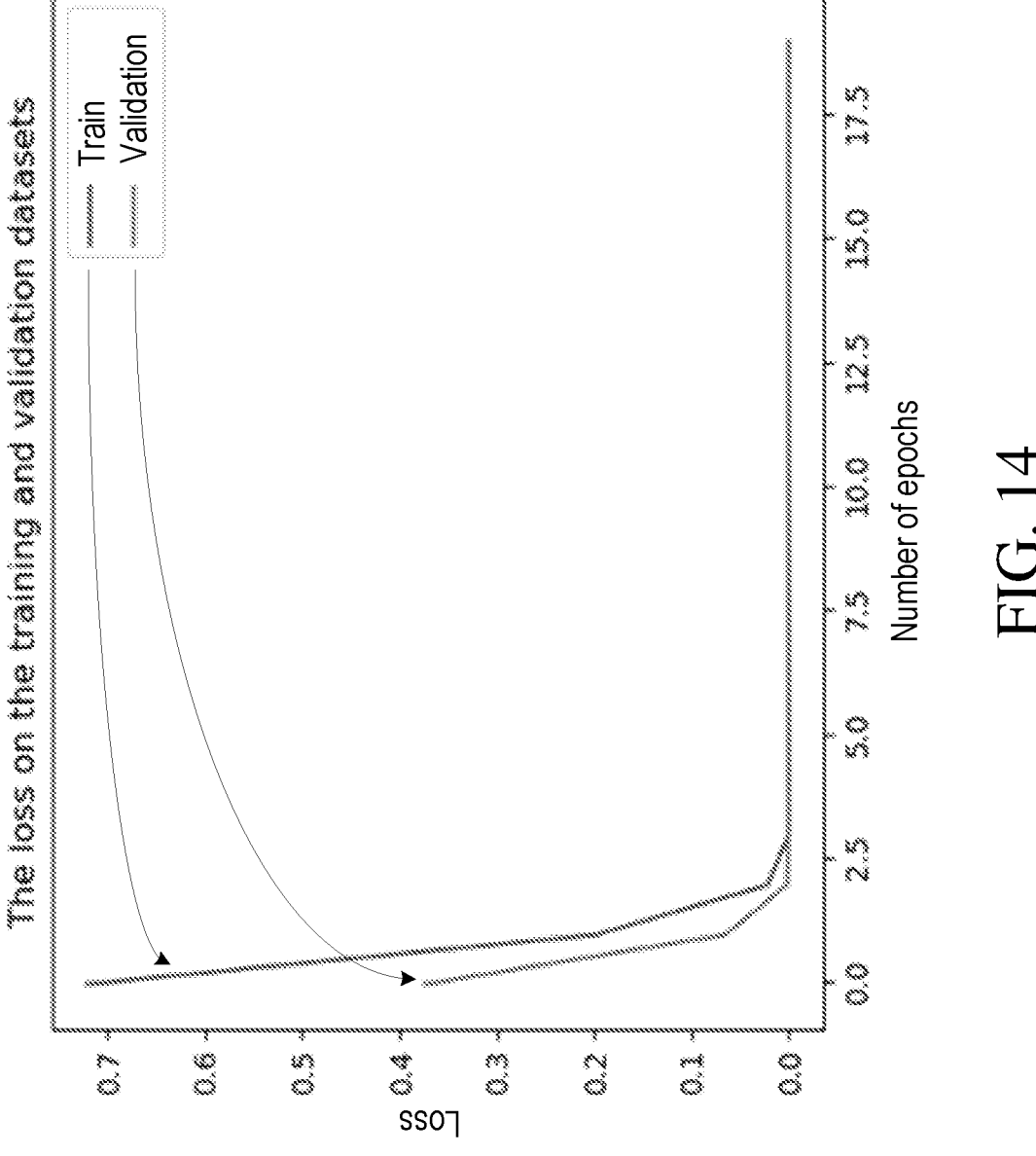
FIG. 14 is a diagram of an example training and validation loss in terms of MSE for the anomaly detection model according to some embodiments of the present disclosure.

FIG. 14 is a diagram that illustrates the loss (reconstruction error) in terms of MSE for the anomaly detection model. Both the training and the validation losses converge to zero after 3 epochs, which shows the capability of the autoencoder to reconstruct the normal input data points with very small loss values. Normal data points may correspond to data points that are within the baseline behavior.

Figure 15:
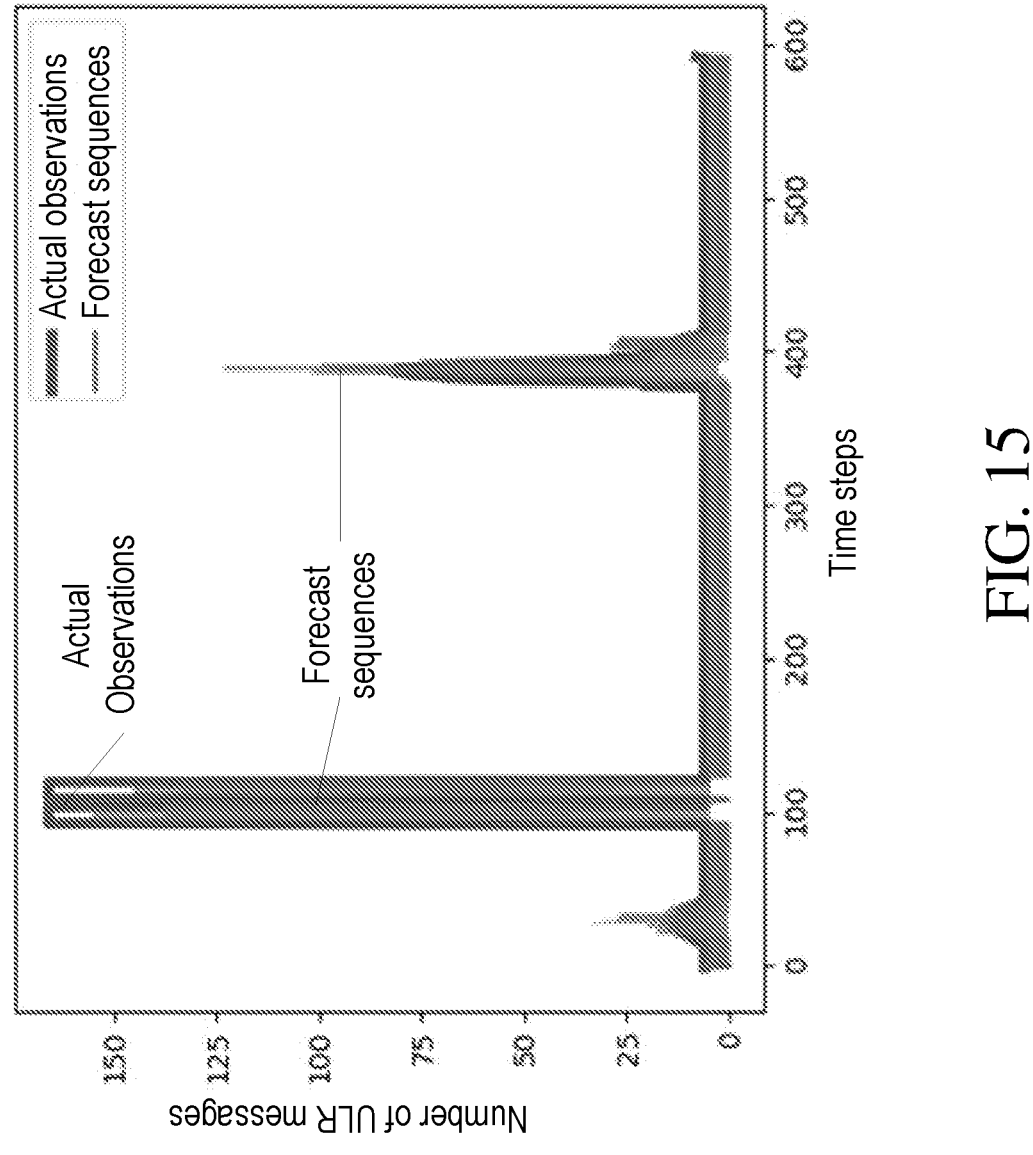
FIG. 15 is a diagram of an example comparison of the actual observations with the forecasted ones according to some embodiments of the present disclosure.

FIG. 15 is a diagram that illustrates the actual observations curve for the total number of Diameter received requests, and the forecast values for the same PM counter in the test data. It is illustrated that the model has a prediction capability (e.g., a good prediction capability) even for the anomalous data points (e.g., the spikes where the total number of received requests exceeds 160) with an overall root mean squared error equal to 22.452, which indicates the good prediction capability of the model for forecasting the future.

Figure 16:
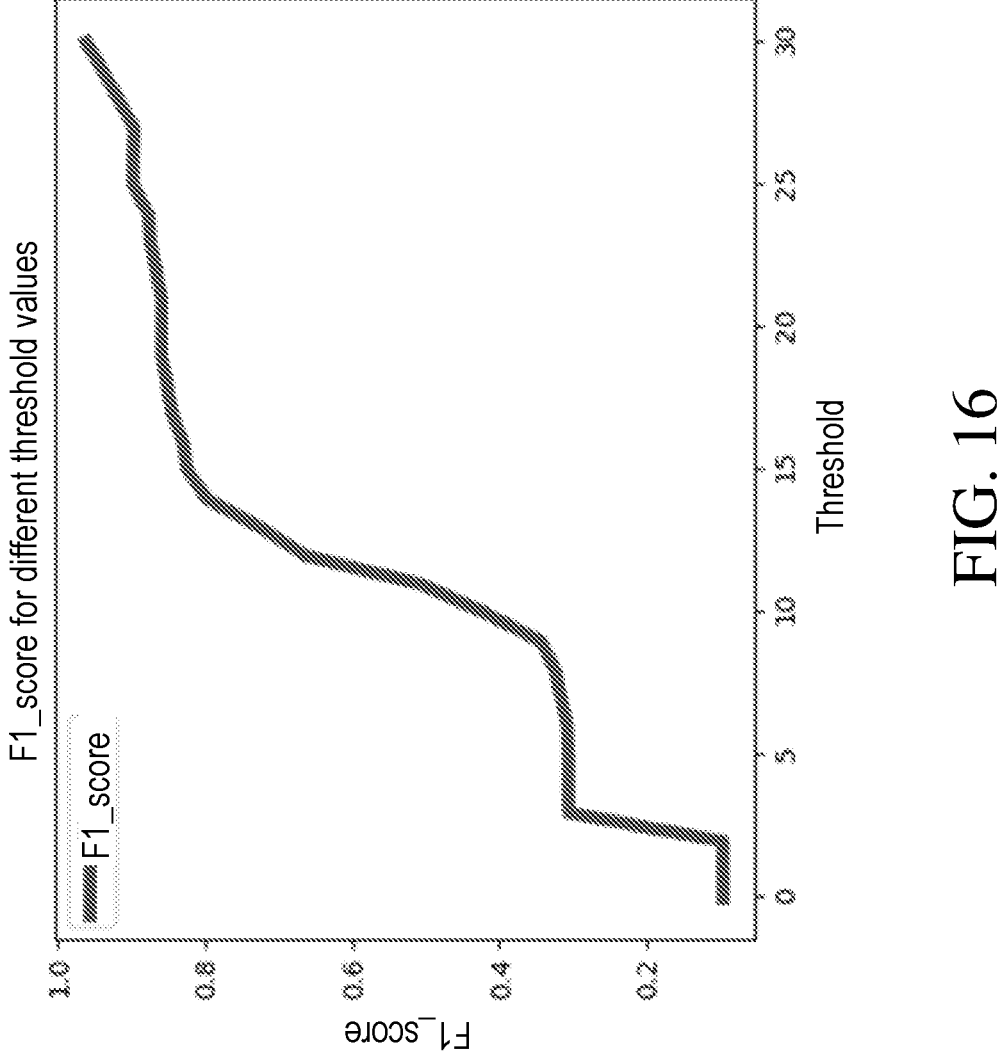
FIG. 16 is a diagram of example F1_score values for different threshold values according to some embodiments of the present disclosure.

FIG. 16 is a diagram illustrating example F1_score values for different threshold values. The F1_score represents the trade-off between precision and recall. The ideal value of F1 score is equal to 1. From the curve, it is illustrated that the best value of F1_score is close to 1 and is reached when the threshold is equal to 30. This means that the model described herein can reconstruct all normal data points with an error equal to zero and can predict anomalies with perfect accuracy for this value of the threshold.

The above results show that models that are in accordance with the teachings of the present disclosure can effectively predict the future values for the total number of received Diameter request, then can proactively detect Diameter signaling anomalies such as the ones related to RSR attack on the HSS.

Additional Information

Generating the Statistical Multivariate Time Series

Figure 17:
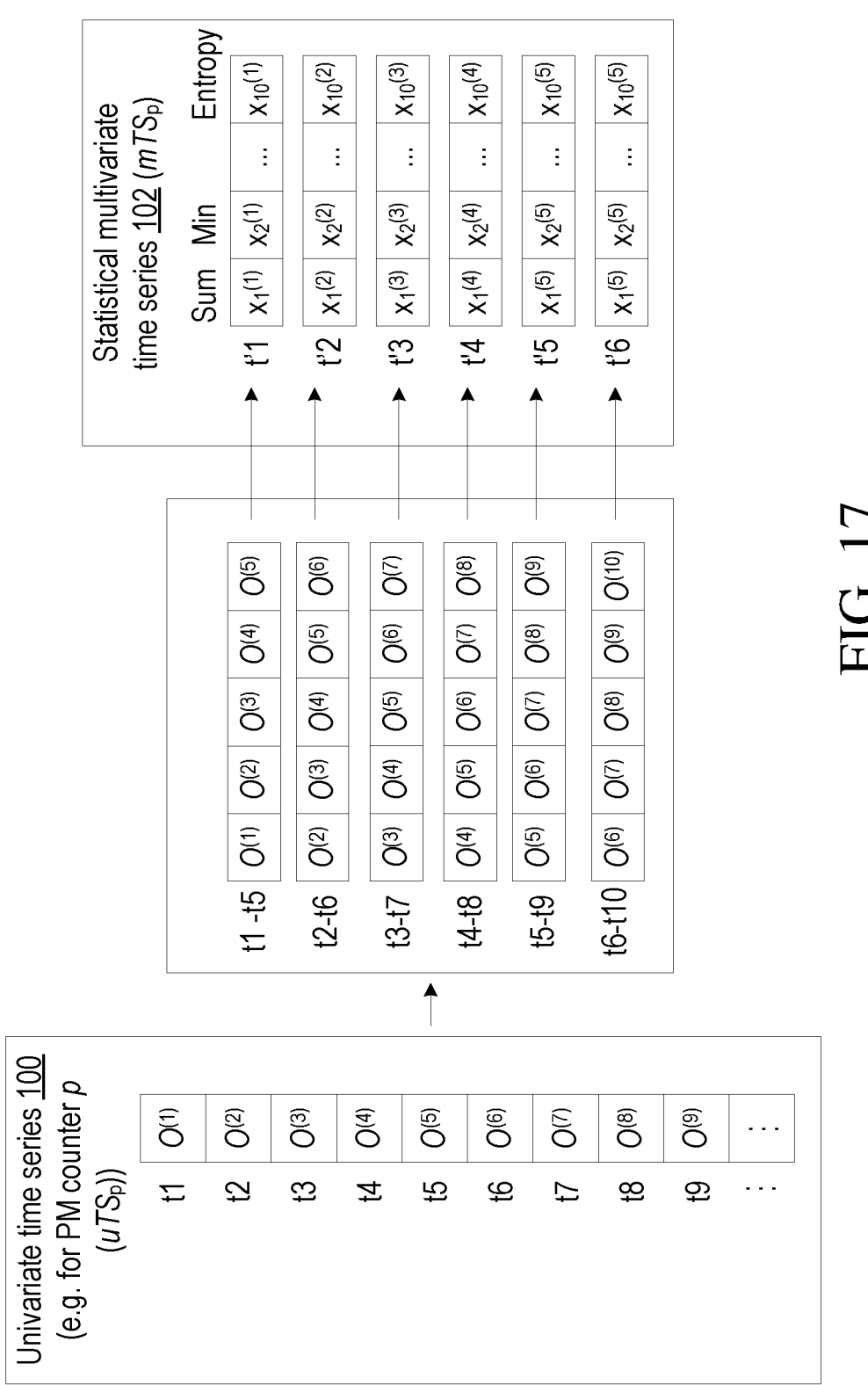
FIG. 17 is a diagram of example generation of statical multivariate services from the univariate time series according to some embodiments of the present disclosure.

The univariate time series 100, e.g., $uTS_p = \{O^{(1)}, O^{(2)}, \ldots, O^{(n)}\}$ recorded for the PM counter p respectively at the time steps 1, 2, . . . , n, is considered in this section. To generate the statistical multivariate time series $mTS_p$ for the PM counter p, a sliding time window of s time steps (such that s<n) is defined, then the statistical features per time window is calculated such that each time window is associated with one data point in $mTS_p$. The sliding time window is shifted by one for each statistical observation as illustrated in FIG. 17. For example, if the current statistical observation is calculated out of the time window composed of the original observations $\{O^{(1)}, O^{(2)}, \ldots, O^{(i)}\}$, then the next statistical observation is calculated over the original observations $\{O^{(2)}, O^{(3)}, \ldots, O^{(i+1)}\}$ (as illustrated in FIG. 17).

This sliding window technique has two advantages. First, it enables to better capture the time dependencies while keeping the statistical dataset large enough for the training. For example, if the original dataset has n observations and the time window is s, then the multivariate time series will have n−s+1 observations. Second, during the online prediction phase, it enables to partly address the missing data problem. For example, if a data transfer failure occurred at one time steps out of the s time steps composing the time window, then the remaining time steps will still allow performing of the forecasting.

Forecasting with LSTM Neural Networks

Figure 18:
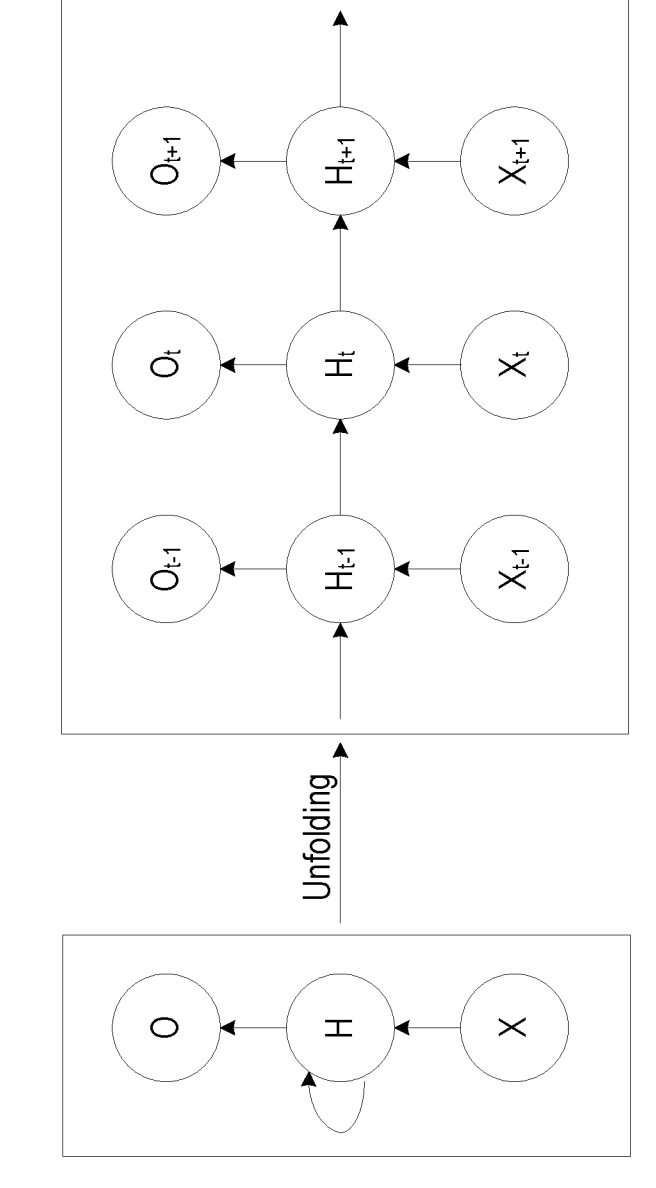
FIG. 18 is an example structure of recurrent neural networks.

Recurrent Neural Networks (RNNs) 108 are a class of neural networks which support the processing of sequential data such as time series by preserving their temporal dimension through a feedback loop serving as a memory as illustrated in FIG. 18. One limitation of RNNs is that they cannot effectively model long-term dependencies, which is referred to as the vanishing gradient problem. Long Short-Term Memory networks (LSTMs) are a class of RNNs which solve this problem by replacing the hidden unit RNN structure with a memory block composed of a memory cell (C), which acts as an accumulator of state information to provide a long-term memory for important information, and three self-parametrized controlling gates to update the memory cell state: The forget gate decides which information to remove from the cell state ($C_{t-1}$). The input gate decides whether to accumulate the new information in the cell state ($C_t$). The output gate decides on whether the cell state ($C_t$) will be propagated to the final state state/output.

This mechanism of memory cell information flow control through gates enables it to keep important information trapped in the cells over a long time before vanishing, which solves the RNN problem and makes LSTM reliable for time series analysis and prediction problems.

Autoencoders

An autoencoder is a special type of multi-layer neural networks belonging to the class of unsupervised learning algorithms. The autoencoder is configured to perform non-linear dimensionality reduction of data.

Figure 19:
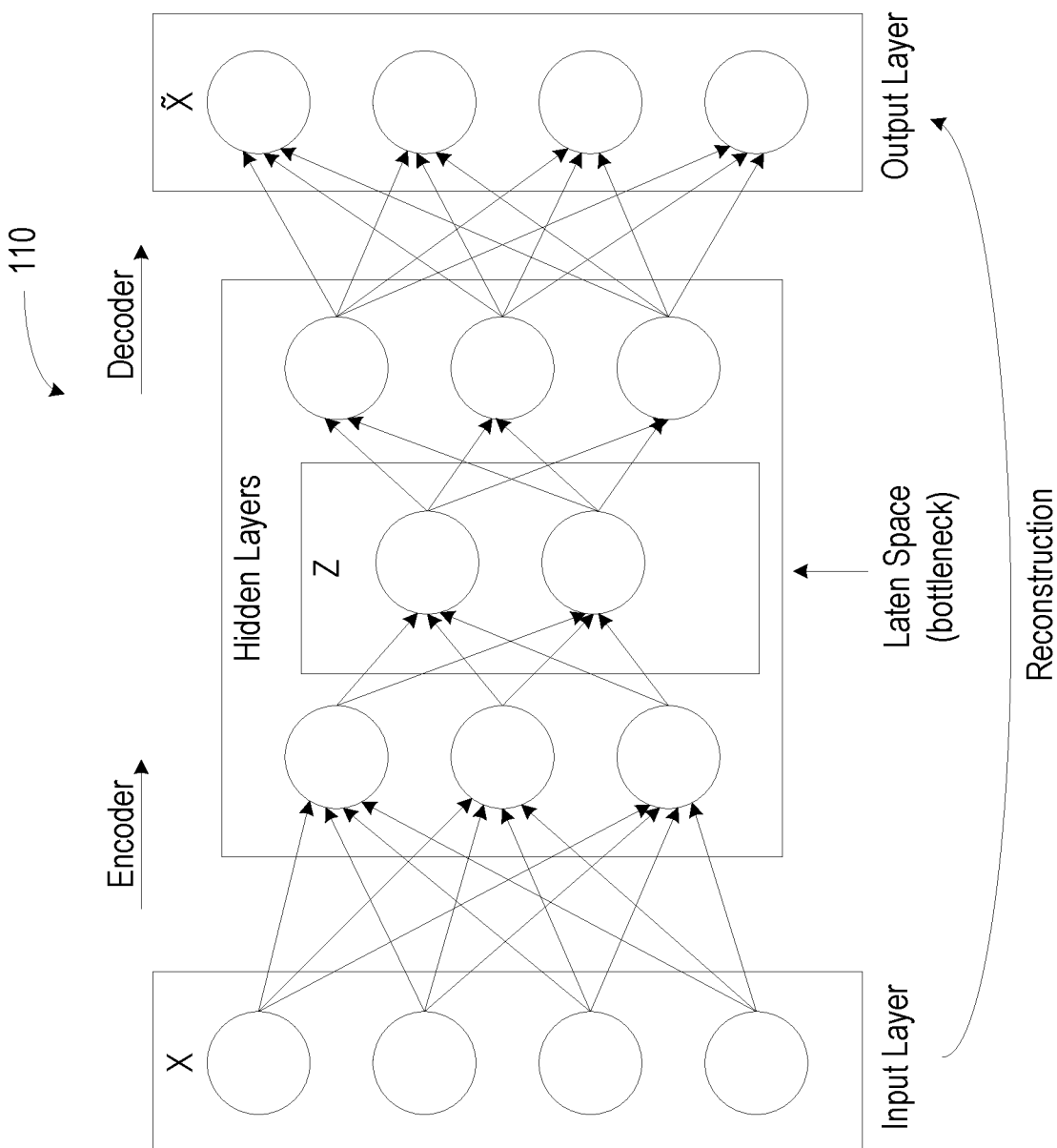
FIG. 19 is a diagram of an example structure of an autoencoder.

FIG. 19 is a diagram illustrating a symmetric structure of an autoencoder 110, where the number of nodes of the input layer is equal to the number of nodes of the output layer and larger than the number of nodes of the intermediate layer, which is called the latent space or the bottleneck. Based on this symmetric architecture, an autoencoder can be considered as a composition of an encoder and a decoder. While the goal of the encoder is to reduce the dimensionality of the input data points (x) into the latent space (z) by learning a compressed representation through correlations discovery, the objective of the decoder is to reconstruct the input as closely as possible ($\tilde{x} \approx x$). More formally, the autoencoder tries to learn an approximation of the identity function $h_{W,b}(x) \approx x$ in a way to output x which is the closest possible to the original input x; w and b being respectively the weight and the noise vectors. In other words, the autoencoder learns to minimize the reconstruction error (scalar residual magnitude) $\|x - \tilde{x}\|$.

Although autoencoders may be used for the overfitting problem, there exist techniques that can be used to improve the generalization such as the dropout technique. Furthermore, it has been proven empirically that with the appropriate hyperparameter choices, autoencoders could outperform other approaches in terms of efficiency.

Anomaly Detection with Autoencoders

Anomaly detection relates to the problem of discovering patterns or rules in order to be able to segregate observations not conforming with the expected behavior. Those data points are referred to as novelties, outliers or anomalies. So often, the outliers correspond to disturbances which may be originating from misconfiguration or malicious activities in the target context.

The degree of success of pattern recognition rely on the engineering of an appropriate feature-set. In this respect, one of the advantages of using autoencoders is that they perform unsupervised feature learning. Furthermore, since autoencoders create a reduced representation of the data, they constitute a natural approach for discovering outliers. The basic idea behind applying autoencoders for anomaly detection is that input outliers are harder to be accurately represented in the reduced space than the input inliers (or normal data points) since they deviate from the discovered latent characteristics. Therefore, it is expected that the error on outliers' reconstruction will be much larger than the error on the reconstruction of inliers.

Note that the anomaly detection is a one class classification problem since the model is trained only with the known patterns (normal data). This is particularly useful to overcome the problem of unbalanced data which is due to the scarcity of anomalous observations.

Identifying Anomalies

As described herein, anomalies are captured based on the reconstruction error also known as the scalar residual magnitude between the input and the reconstructed output ($\|x-\tilde{x}\|$). The following formulas can be used to define anomaly scores:

Mean Square Error (MSE):

$$MSE(x, \tilde{x}) = \frac{1}{n}\sum_{i=1}^{n}(x_i - \tilde{x}_i)^2$$

Root Mean Square Error (RMSE):

$$RMSE(x) = \sqrt{MSE(x)}$$

Mean Absolute Error (MAE):

$$MAE(x) = \frac{\sum_{i=1}^{n}|\tilde{x}_i - x_i|}{n}$$

The choice of the formula depends on the context. For example, MSE is more punishing than MAE while RMSE provides errors in the unit of the input which could be useful for univariate time series analysis. That is, MSE is more punishing in the sense that when a same error is evaluated using MSE, MAE and RMSE, MSE will give the largest error.

Based on the chosen formula, a threshold $\sigma$ needs to be defined to segregate between anomalous and normal observations. If the resulting anomaly score is beyond a threshold $\sigma$ then the data point is considered as anomalous. Example algorithm 1 presents the steps of autoencoder-based anomaly detection. The algorithm assigns an anomaly score (i.e., MSE in this case) to each data point, then a threshold $\sigma$ is specified to decide on whether a given point is anomalous or not. Indeed, if the anomaly score is greater than the threshold then the data point is flagged as anomalous otherwise it is considered as normal. At this level, the anomaly detection problem becomes a classification problem for which the accuracy can be evaluated using the supervised learning performance metrics as discussed in the next section.

---

Algorithm 1: Outlier detection

Input: training_data: X,     test_data: x,     threshold: σ
Output: anomaly
M = trainAutoencoder(X)
anomaly ← [ ]

For $x_i \in$ x do
        $\tilde{x}_i$ = M.predict($x_i$)

score$_i$ = MSE($x_i$, $\tilde{x}_i$)
    If score$_i$ > σ then:
      anomaly.add([$x_i$, $\tilde{x}_i$])
    End if
End for
Return anomaly

---

Note that there are other techniques for detecting outliers. For instance, instead of relying only on the MSE which is an aggregate value, a set of features is extracted from the hidden layers of the autoencoder (e.g., signal residual, absolute residual, squared residual), then, those features are fed into one class classification SVM algorithm to decide on the abnormality of the data points. Also, variational autoencoders and adversarial autoencoders have been used to derive more sophisticated techniques for evaluating the reconstruction error.

Choosing the Best Threshold Using Performance Metrics

Defining the best threshold $\sigma$ plays a vital role on reducing both the false positives and the false negatives. One possible way for choosing the threshold is to evaluate the performance metrics for different possible thresholds. To evaluate the accuracy of the model, the data is first labeled, then supervised learning is performed and performance metrics are evaluated, namely, the precision, the recall and the F1-score.

The precision metric indicates the ability of the model to identify only relevant data points (anomalies), which means that high values for the precision metric is an indicator of low false positive rate. The precision metric is evaluated using Formula (1), where TP and FP respectively indicate the True Positives and False Positives.

$$Precision = TP/(TP + FP) \tag{1}$$

The recall metric indicates the ability of the model to identify all the relevant data points (anomalies). That is, a high value for the recall metric reflects a low false negative rate. The recall metric is evaluated using Formula (2), where FN stands for False Negatives.

$$Recall = TP/(TP + FN) \tag{2}$$

The F1-score is the harmonic mean of the precision and the recall for a given threshold. It is calculated following Formula (3).

$$F1\_score = 2 \times (\text{precision} \times \text{recall})/(\text{precision} + \text{recall}) \quad (3)$$

Overall, the best threshold may be the one which provides the highest F1_score values. However, in some situations, the tradeoff between the recall and the precision can be handled depending on the criticality of the system (e.g., the recall could be preferred over the precision if every data point at risk needs to be flagged for investigation in a critical system).

Therefore, one or more embodiments described herein provide one or more of the following benefits:

Forecast the future control plane signaling at the core network for different 3GPP interfaces.

Proactively detects anomalies in the control plane signaling at the core network for different 3GPP interfaces.

Forecast the future control plane signaling between the HSS and different MMEs located within the same home network or within other visited networks considering different characteristics (number of received Diameter requests, number of received authentication information requests, number of malformed packets, etc.).

Proactively detect anomalies of the control plane signaling between the HSS and different MMEs located within the same home network or within other visited networks considering different characteristics (number of received Diameter requests, number of received authentication information requests, number of malformed packets, etc.).

Issue recommendations to trigger appropriate mitigation actions preventing large scale damage of possible future attacks.

Augment control plane network functions with a proactive anomaly detection mechanism to capture Diameter signaling attacks.

The following is a list of examples:

Example A1. A detection node 17 configured to communicate with at least one core network node, the detection node 17 configured to, and/or comprising a radio interface and/or comprising processing circuitry 64 configured to:

train a prediction model for forecasting future signaling behavior, the prediction model being trained using at least a training dataset;

train a signaling model to profile signaling behavior for a predefined future time window, the signaling model being trained using at least the training dataset; and detect abnormal behavior in the forecasted future signaling behavior based at least on the prediction model and signaling model, the signaling behavior corresponding to control plane Diameter signaling behavior.

Example A2. The detection node 17 of Example A1, wherein the forecasted future signaling behavior is input into the signaling model for the detecting of the abnormal behavior.

Example A3. The detection node 17 of any one of Examples A1-A2, wherein the training dataset is based at least on a multivariate time series that has been transformed to input sequences and output sequences.

Example B1. A method implemented in a detection node 17 that is configured to communicate with at least one core network node, the method comprising:

training a prediction model for forecasting future signaling behavior, the prediction model being trained using at least a training dataset;

training a signaling model to profile signaling behavior for a predefined future time window, the signaling model being trained using at least the training dataset; and detecting abnormal behavior in the forecasted future signaling behavior based at least on the prediction model and signaling model, the signaling behavior corresponding to control plane Diameter signaling behavior.

Example B2. The method of Example B1, wherein the forecasted future signaling behavior is input into the signaling model for the detecting of the abnormal behavior.

Example B3. The method of any one of Examples B1-B2, wherein the training dataset is based at least on a multivariate time series that has been transformed to input sequences and output sequences.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

AAA Authentication, Authorization and Accounting

AIA Authentication Information Answer

AIR Authentication Information Request

AVPs Attribute Value Pairs

DEA Diameter Edge Agent

EPC Evolved Packet Core

HSS Home Subscriber Server

MME Mobility Management Entity

MSE Mean Square Error

NFV Network Function Virtualization

PUA Purge User Answer

PUR Purge User Request

ULA Update Location Answer

ULR Update Location Request

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A detection node comprising processing circuitry configured to:
   determine a forecast sequence using a first prediction model, the forecast sequence being determined based at least in part on an input sequence;
   determine a reconstructed forecast sequence using a second prediction model, the reconstructed forecast sequence being determined based at least in part on the determined forecast sequence;
   determine a reconstruction error between the determined reconstructed forecast sequence and the determined forecast sequence; and
   determine a signaling behavior for anomaly detection based at least in part on the determined reconstruction error and a predetermined threshold.

2. The detection node of claim 1, wherein the detection node further comprises a communication interface configured to:
   receive at least one performance measurement counter associated with at least one signal, the determined signaling behavior being associated with the at least one signal.

3. The detection node of claim 2, wherein the at least one performance measurement counter is associated with application-level statistics based on a Diameter protocol, the at least one performance measurement counter being used to train at least one of the first and second prediction models.

4. The detection node of claim 3, wherein the processing circuitry is further configured to:
   determine a count of at least one of a successful request, an unsuccessful request, a successful response, an unsuccessful response associated with the at least one signal; and
   determine at least one statistical feature based at least on the determined count.

5. The detection node of claim 2, wherein the processing circuitry is further configured to:
   determine the input sequence based at least in part on the received at least one performance measurement counter.

6. The detection node of claim 5, wherein the determining of the input sequence includes:
   determining a statistical multivariate time series for the at least one performance measurement counter; and
   using supervised learning to determine the input sequence based on the statistical multivariate time series.

7. The detection node of claim 5, wherein the first prediction model is a long short-term memory, LSTM, and the second prediction model is an autoencoder.

8. The detection node of claim 1, wherein the reconstructed forecast sequence is a reconstructed vector.

9. The detection node of claim 1, wherein the reconstruction error is a scalar residual magnitude between the forecast sequence and the reconstructed forecast sequence.

10. The detection node of claim 1, wherein the determining of the signaling behavior includes at least one of:
   determining whether the signaling behavior is one of an abnormal signaling behavior and a normal signaling behavior; and
   flagging at least the abnormal signaling behavior.

11. The detection node of claim 10, wherein the processing circuitry is further configured to:
   determine at least one anomaly score to determine whether the signaling behavior is one of the abnormal signaling behavior and the normal signaling behavior based at least in part on the determined reconstruction error and the predetermined threshold, the abnormal signaling behavior being flagged when the at least one anomaly score is greater than the predetermined threshold.

12. The detection node of claim 11, wherein the predetermined threshold is based on a harmonic mean of precision and recall of the predetermined threshold.

13. The detection node of claim 1, wherein the forecast sequence profiles at least one signaling behavior for a future time window.

14. A method in a detection node, the method comprising:

determining a forecast sequence using a first prediction model, the forecast sequence being determined based at least in part on an input sequence;

determining a reconstructed forecast sequence using a second prediction model, the reconstructed forecast sequence being determined based at least in part on the determined forecast sequence;

determining a reconstruction error between the determined reconstructed forecast sequence and the determined forecast sequence; and determining a signaling behavior for anomaly detection based at least in part on the determined reconstruction error and a predetermined threshold.

15. The method of claim 14, wherein the method further includes:

receiving at least one performance measurement counter associated with at least one signal, the determined signaling behavior being associated with the at least one signal.

16. The method of claim 15, wherein the at least one performance measurement counter is associated with application-level statistics based on a Diameter protocol, the at least one performance measurement counter being used to train at least one of the first and second prediction models.

17. The method of claim 16, wherein the method further includes:

determining a count of at least one of a successful request, an unsuccessful request, a successful response, an unsuccessful response associated with the at least one signal; and determining at least one statistical feature based at least on the determined count.

18. The method of claim 15, wherein the method further includes:

determining the input sequence based at least in part on the received at least one performance measurement counter.

19. The method of claim 18, wherein the determining of the input sequence includes:

determining a statistical multivariate time series for the at least one performance measurement counter; and using supervised learning to determine the input sequence based on the statistical multivariate time series.

20. The method of claim 18 wherein the first prediction model is a long short-term memory, LSTM, and the second prediction model is an autoencoder.

21. The method of claim 14, wherein the reconstructed forecast sequence is a reconstructed vector.

22. The method of claim 14, wherein the reconstruction error is a scalar residual magnitude between the forecast sequence and the reconstructed forecast sequence.

23. The method of claim 14, wherein the determining of the signaling behavior includes at least one of:

determining whether the signaling behavior is one of an abnormal signaling behavior and a normal signaling behavior; and flagging at least the abnormal signaling behavior.

24. The method of claim 23, wherein the method further includes:

determining at least one anomaly score to determine whether the signaling behavior is one of the abnormal signaling behavior and the normal signaling behavior based at least in part on the determined reconstruction error and the predetermined threshold, the abnormal signaling behavior being flagged when the at least one anomaly score is greater than the predetermined threshold.

25. The method of claim 24, wherein the predetermined threshold is based on a harmonic mean of precision and recall of the predetermined threshold.

26. The method of claim 14, wherein the forecast sequence profiles at least one signaling behavior for a future time window.

* * * * *